US008141605B2

(12) United States Patent
Park

(10) Patent No.: US 8,141,605 B2
(45) Date of Patent: Mar. 27, 2012

(54) DEVICE FOR PREVENTING SLIPPING OF VEHICLE

(76) Inventor: Il-Jun Park, Seoul (KR)

(*) Notice: Subject to any disclaimer, the term of this patent is extended or adjusted under 35 U.S.C. 154(b) by 0 days.

(21) Appl. No.: 12/530,357

(22) PCT Filed: Mar. 6, 2008

(86) PCT No.: PCT/KR2008/001270
§ 371 (c)(1),
(2), (4) Date: Feb. 26, 2010

(87) PCT Pub. No.: WO2008/108586
PCT Pub. Date: Sep. 12, 2008

(65) Prior Publication Data
US 2010/0163147 A1    Jul. 1, 2010

(30) Foreign Application Priority Data
Mar. 8, 2007  (KR) .................. 10-2007-0023109

(51) Int. Cl.
*B60C 27/06* (2006.01)
(52) U.S. Cl. ............... 152/220; 152/219; 152/213 R; 301/41.1
(58) Field of Classification Search ............ 152/217, 152/219, 220, 221, 222, 223, 224, 225 R, 152/226, 213 R; 301/41.1, 42, 43, 44.1, 301/44.2, 52; 24/69 ST, 70 ST, 71 ST
See application file for complete search history.

(56) References Cited

U.S. PATENT DOCUMENTS

| | | | |
|---|---|---|---|
| 2,263,542 A * | 11/1941 | Keiling et al. ........... | 152/220 |
| 2,581,578 A * | 1/1952 | Cruse ..................... | 152/217 |
| 3,103,242 A * | 9/1963 | Culp ....................... | 152/230 |
| 3,317,967 A * | 5/1967 | Rounds et al. ........... | 24/70 R |
| 3,581,797 A * | 6/1971 | Kinnucan ................ | 152/220 |
| 3,696,852 A * | 10/1972 | Oulman .................. | 152/220 |
| 6,543,501 B2 * | 4/2003 | Ferreira ................. | 152/225 R |
| 6,581,661 B1 * | 6/2003 | Morrison et al. ........ | 152/232 |
| 6,725,894 B2 | 4/2004 | Clark | |
| 7,107,655 B1 * | 9/2006 | Huang .................... | 24/68 CD |

FOREIGN PATENT DOCUMENTS

JP          9-323516          12/1997
(Continued)

OTHER PUBLICATIONS

Extended European Search Report for PCT/KR2008/001270 dated Mar. 9, 2011.

(Continued)

*Primary Examiner* — Kip T Kotter
(74) *Attorney, Agent, or Firm* — Nixon & Vanderhye PC

(57) ABSTRACT

A device for preventing slipping of a vehicle is disclosed, which improves a vehicle slipping prevention device in which a plurality of spikes connected with a connection member are inserted into a gap between double wheels disposed at a rear side of a large size vehicle at regular intervals for preventing slipping. In the present invention, a structure contacting with a tire surface along with a spike is newly improved, and a structure of an engaging member used for maintaining the tensional force of a plurality of spikes connected by means of a connection member is newly improved. It is possible to achieve a fast and simple engaging and disengaging work and to keep a substantial tensional force so that a vehicle slipping prevention device is not disengaged even during a long time drive of a vehicle.

3 Claims, 19 Drawing Sheets

FOREIGN PATENT DOCUMENTS

| | | |
|---|---|---|
| KR | 20-0289488 | 9/2002 |
| KR | 20-0424423 | 8/2006 |
| KR | 10-2008-0013695 | 2/2008 |
| WO | 2006/049403 | 5/2006 |

OTHER PUBLICATIONS

International Search Report for PCT/KR2008/001270, mailed Jun. 24, 2008.

* cited by examiner

[Fig. 1]
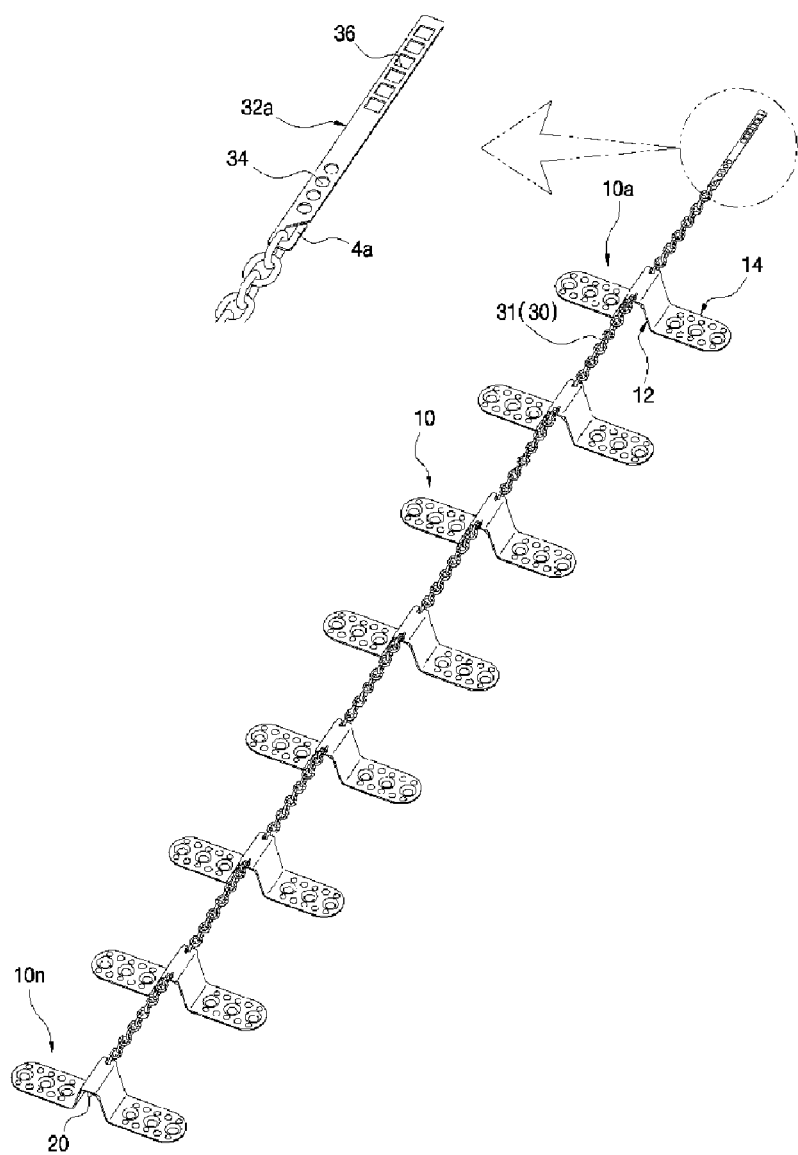
[Fig. 2]
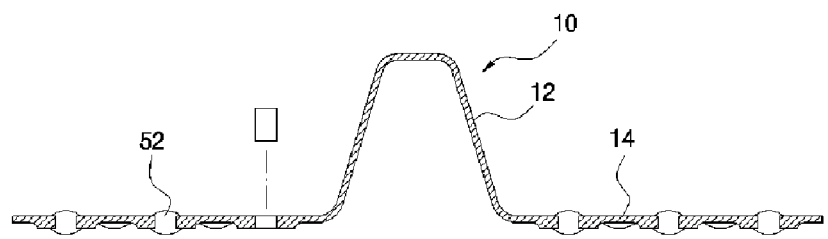

[Fig. 3]
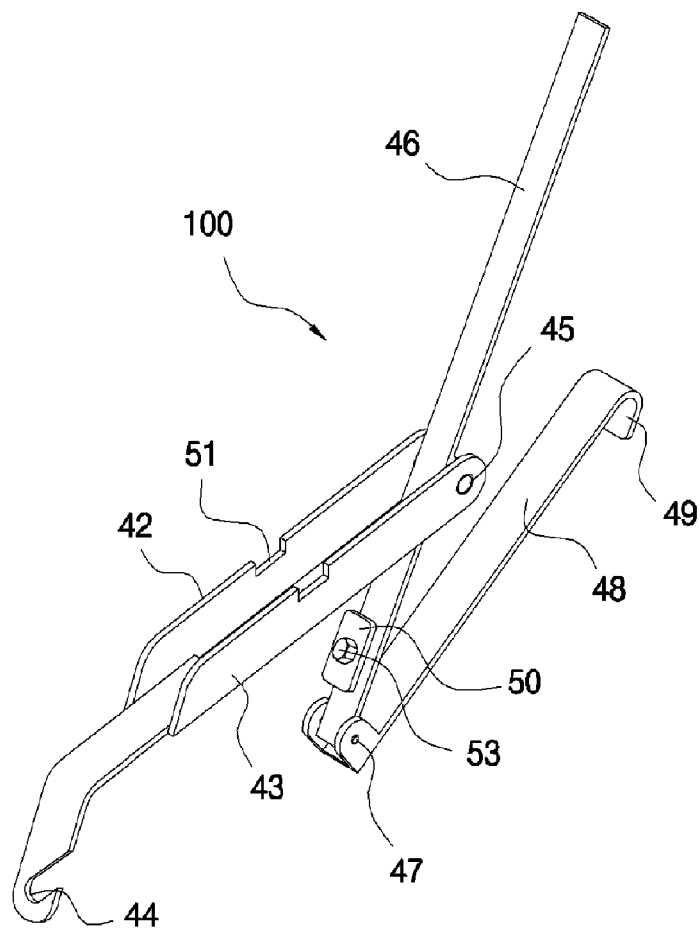
[Fig. 4]
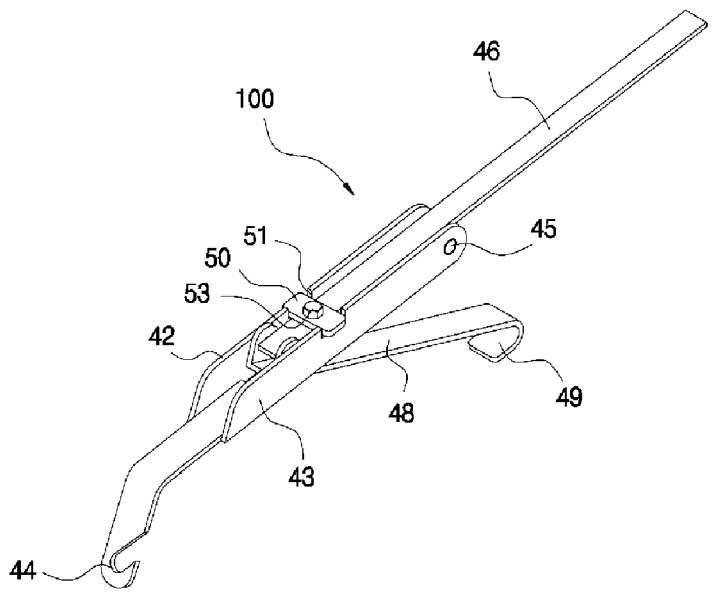

[Fig. 5]
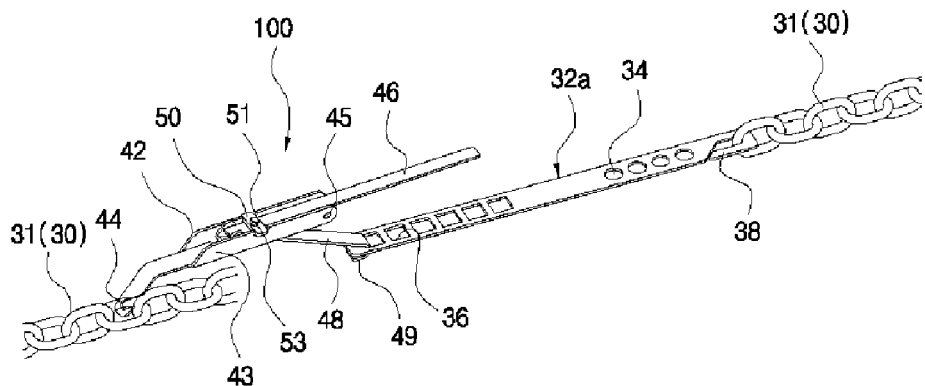
[Fig. 6]
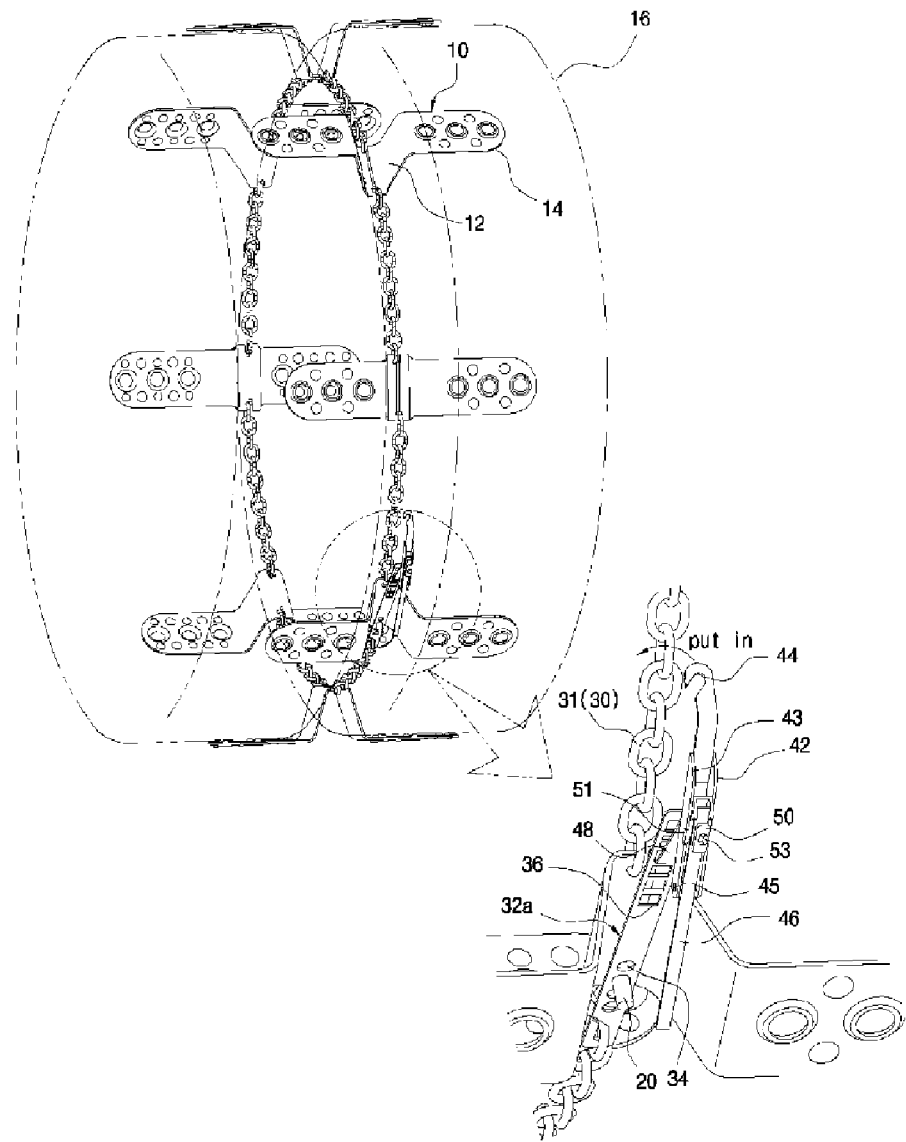

[Fig. 7]
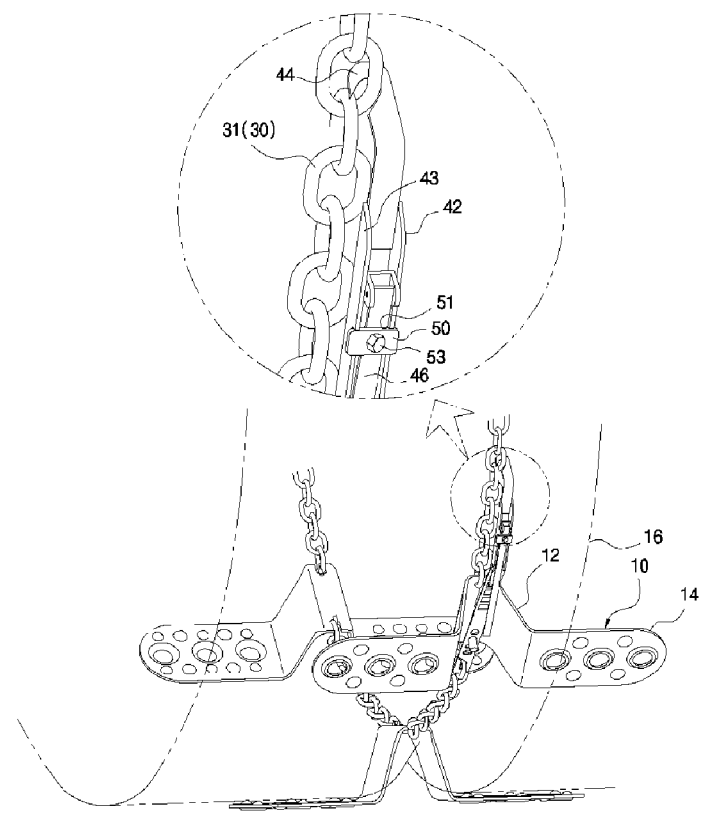
[Fig. 8]
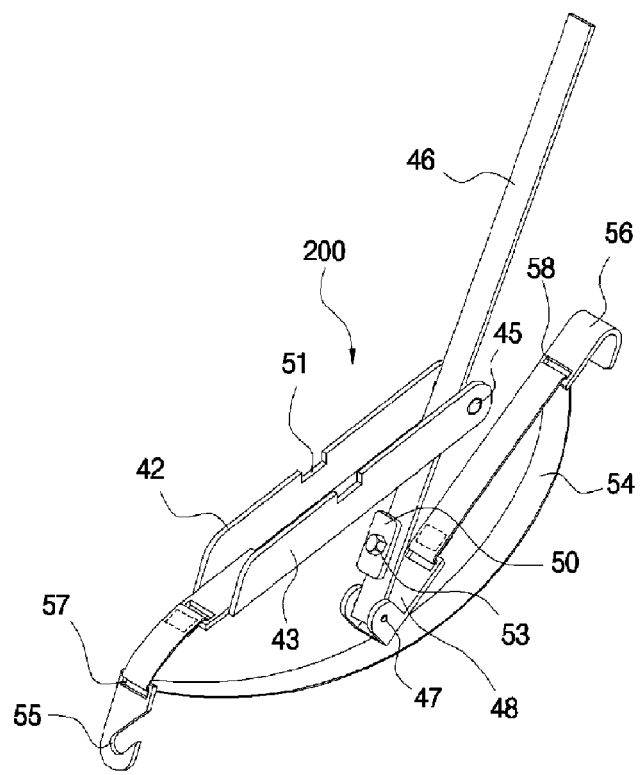

[Fig. 9]
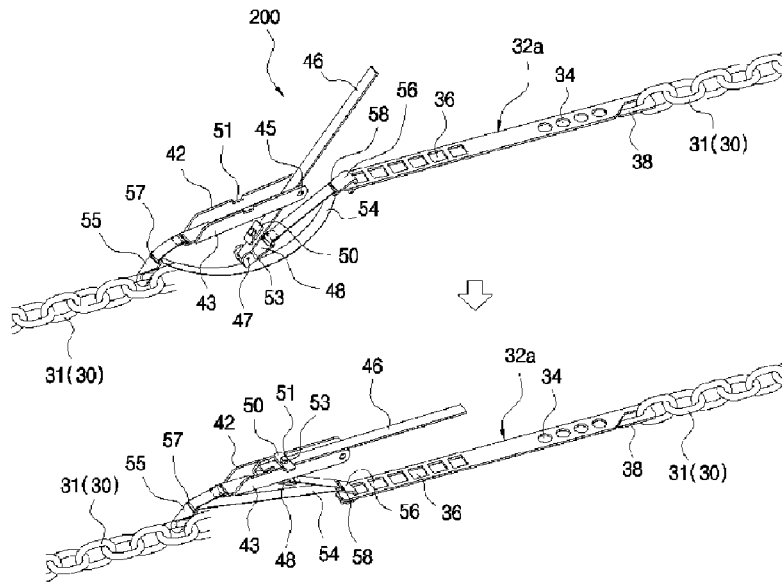
[Fig. 10]
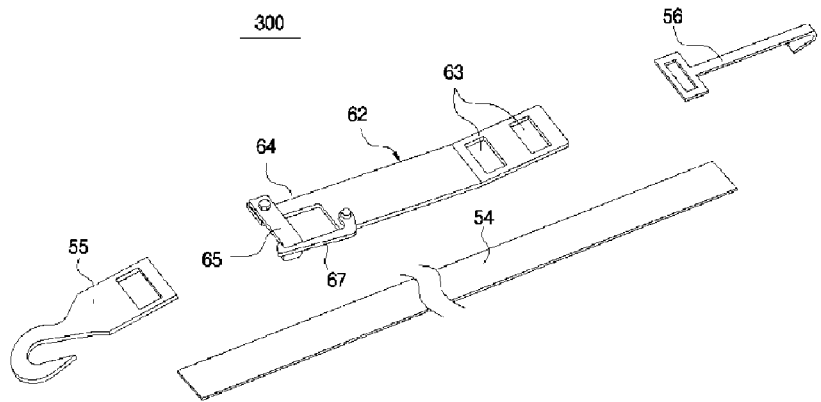
[Fig. 11]
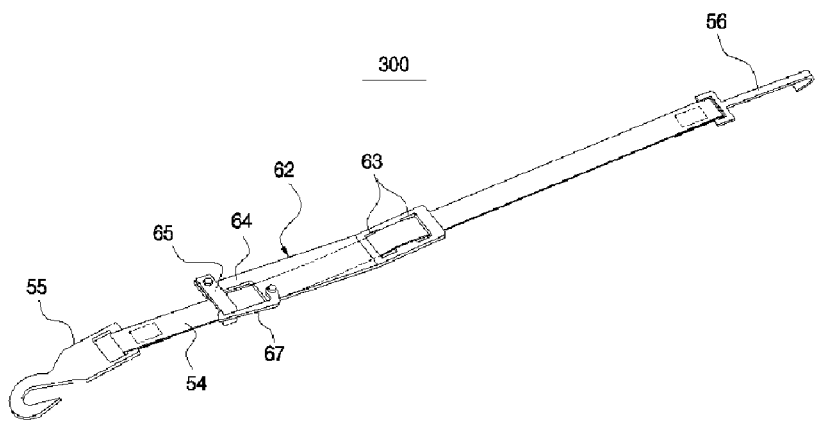

[Fig. 12]
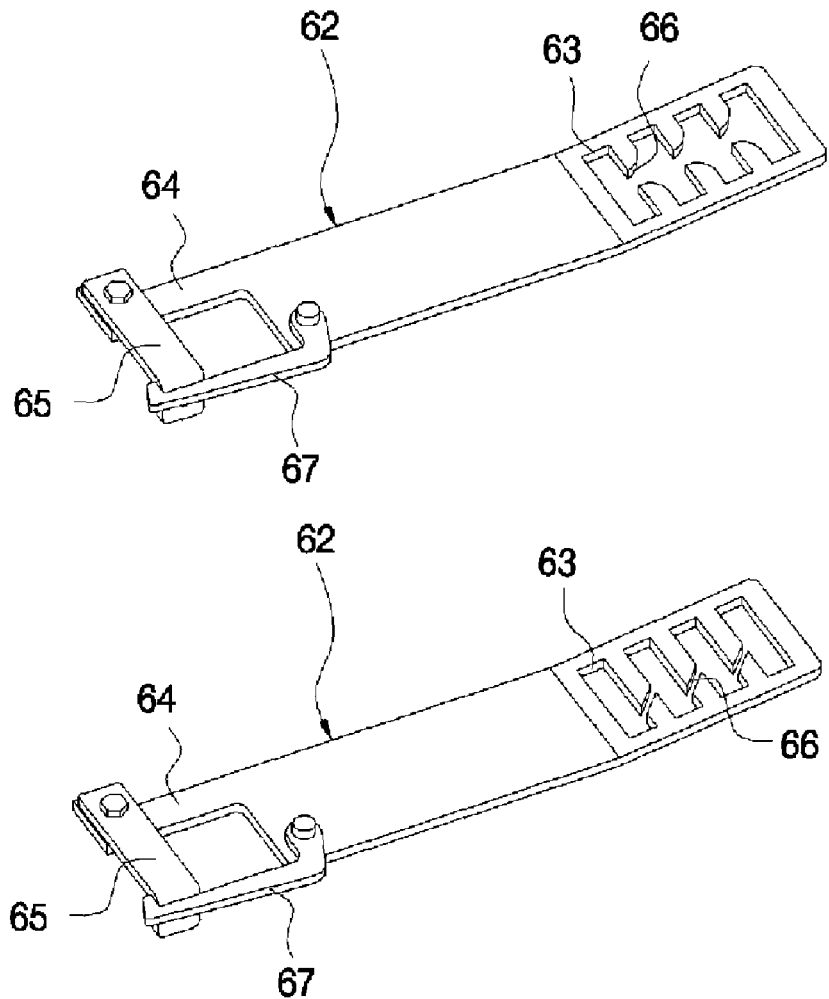
[Fig. 13]
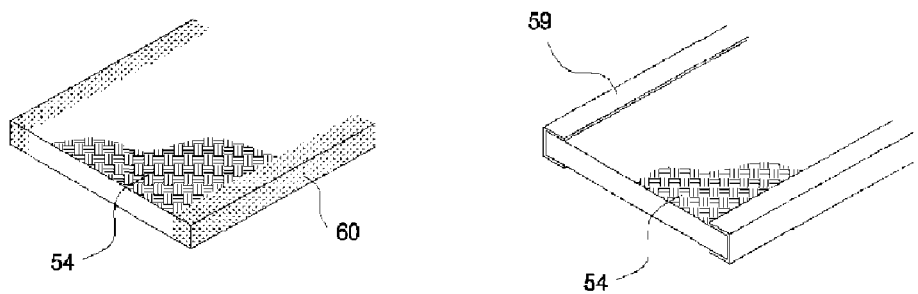

[Fig. 14]
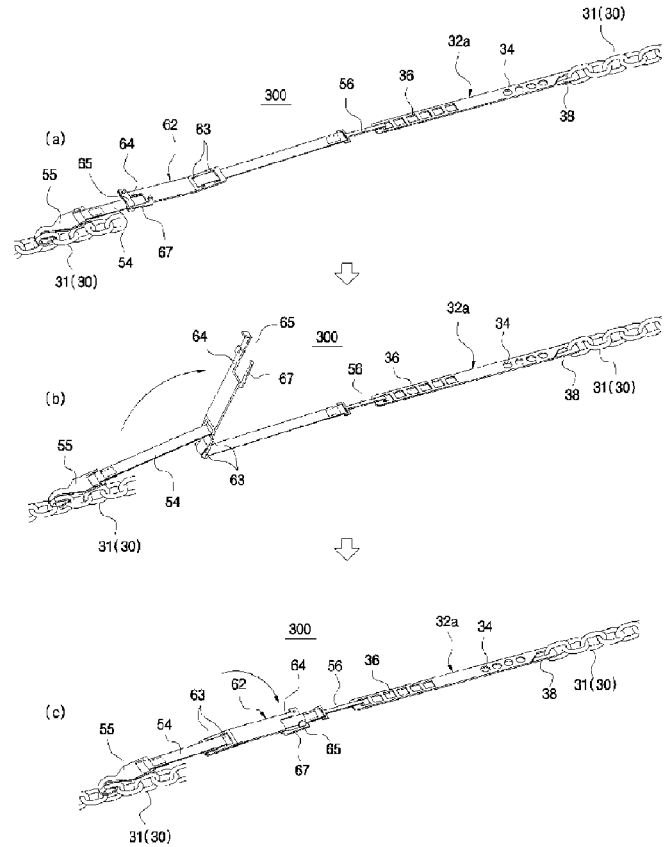
[Fig. 15]
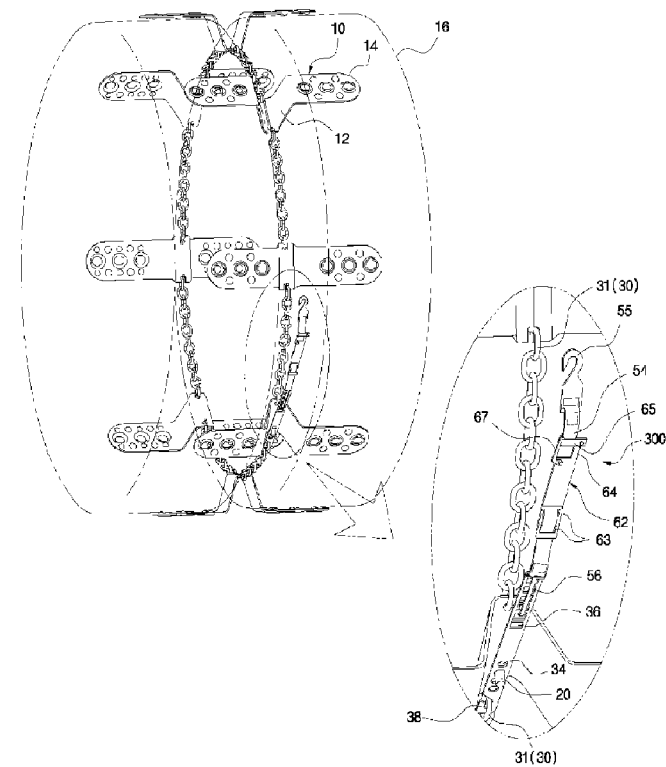

[Fig. 16]
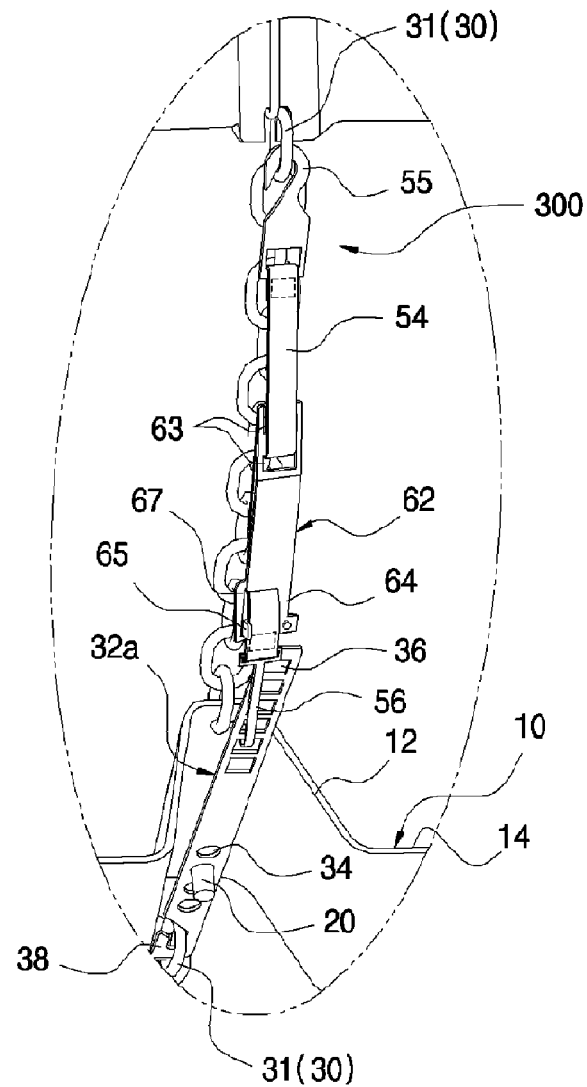
[Fig. 17]
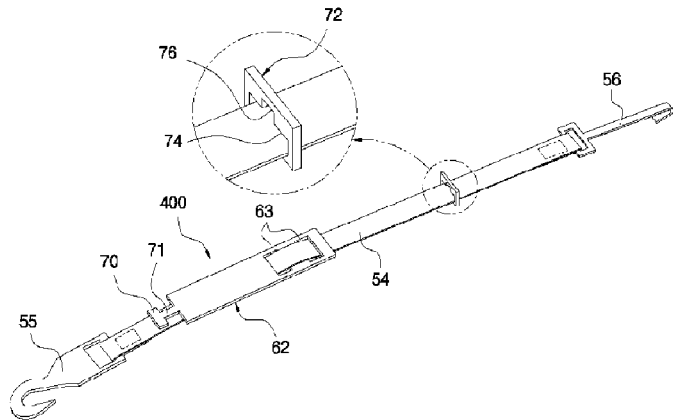

[Fig. 18]
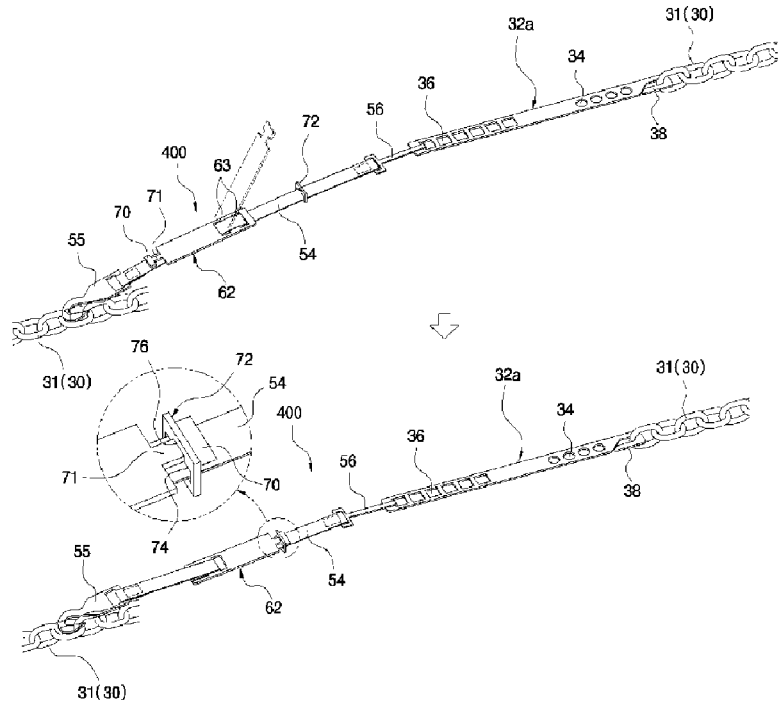
[Fig. 19]
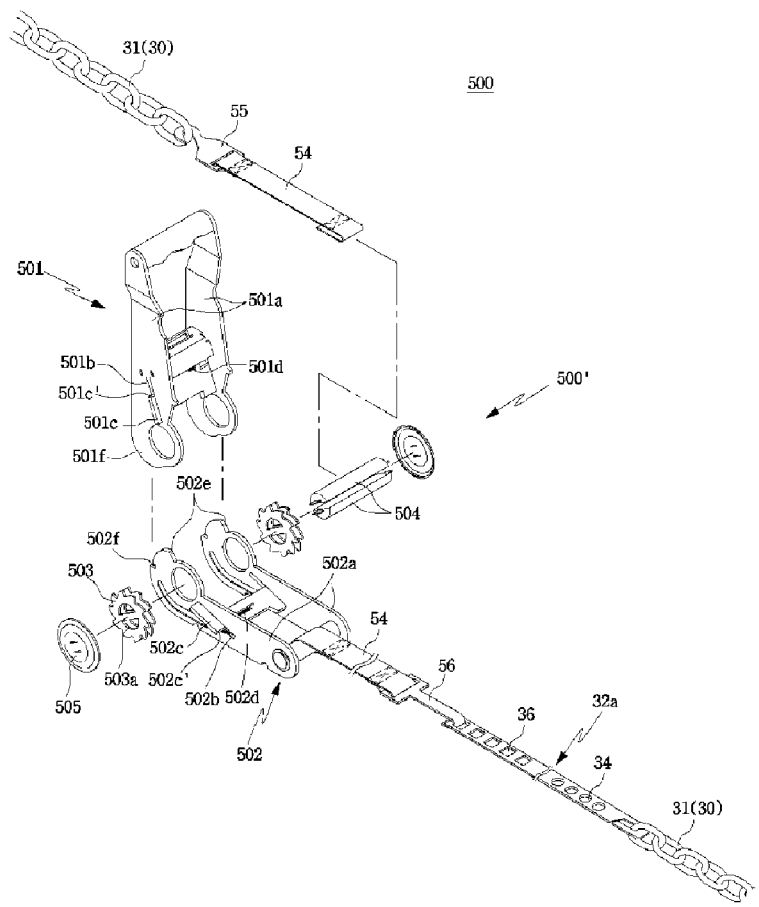

[Fig. 20]
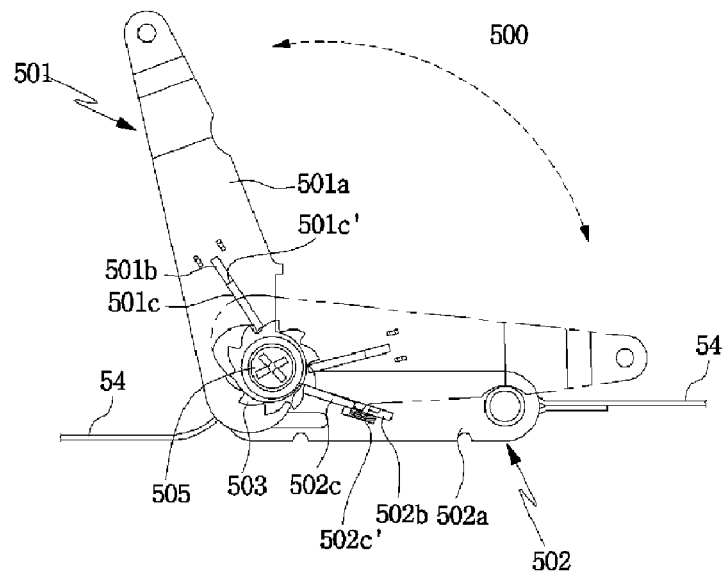
[Fig. 21]
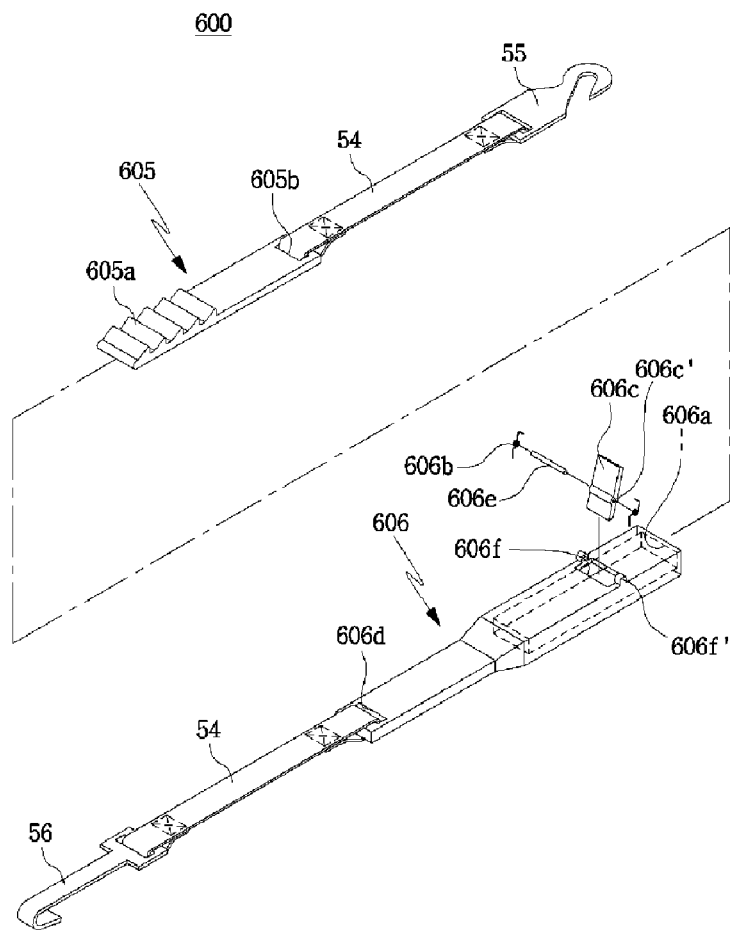

[Fig. 22]
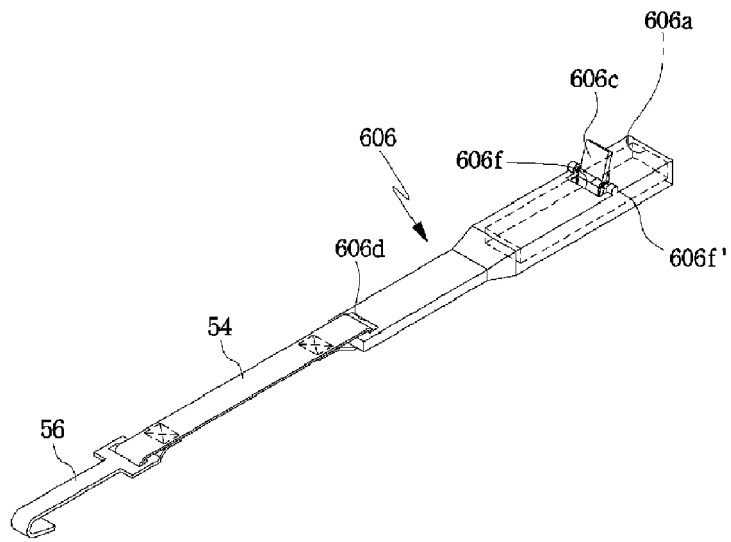
[Fig. 23]
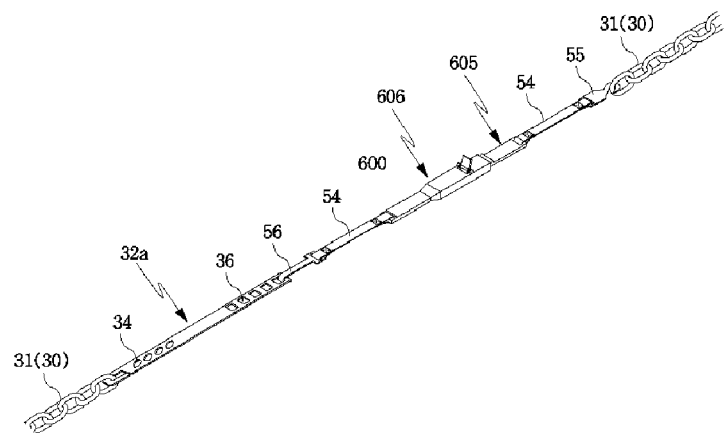
[Fig. 24]
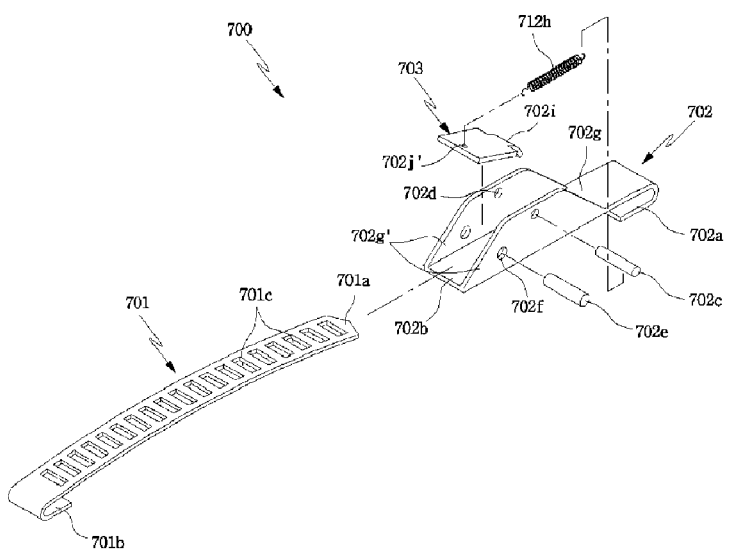

[Fig. 25]
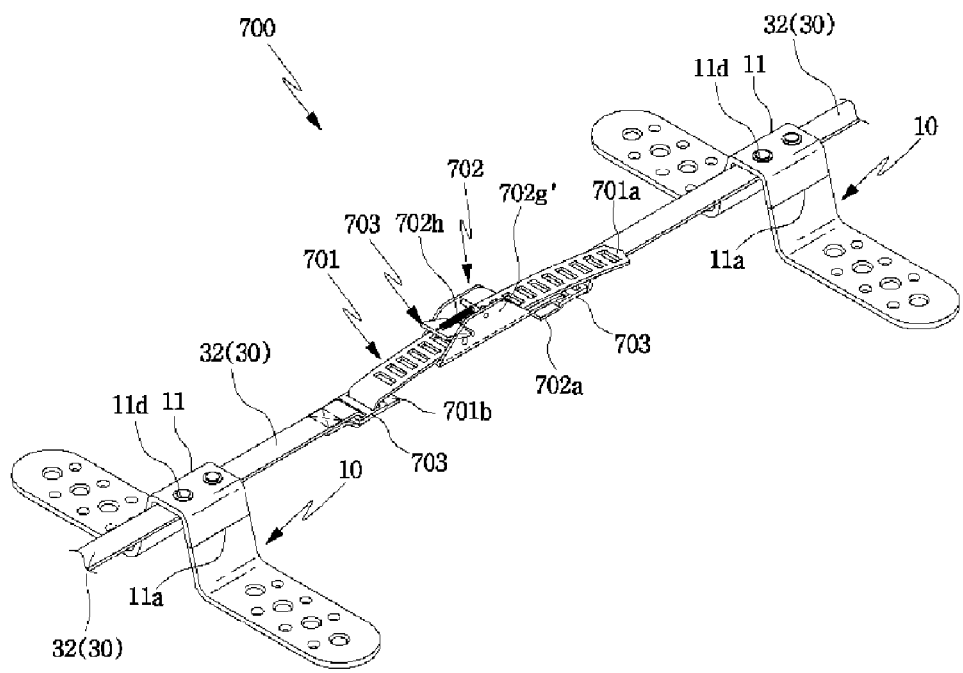
[Fig. 26]
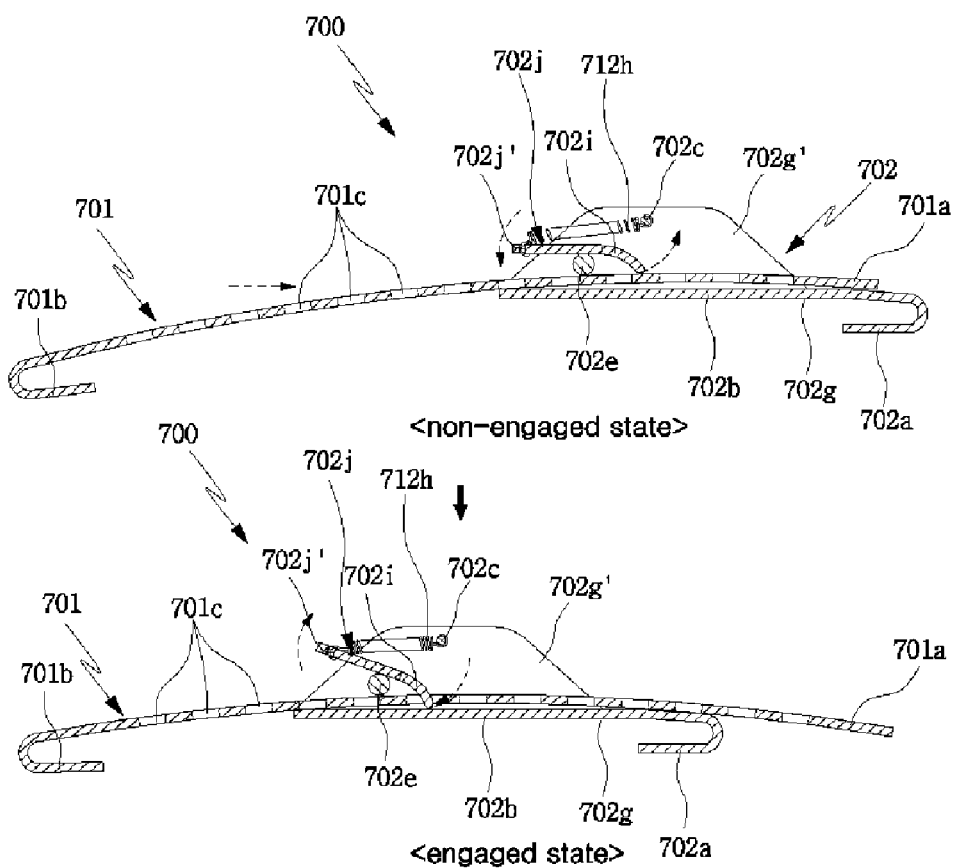
<non-engaged state>
<engaged state>

[Fig. 27]
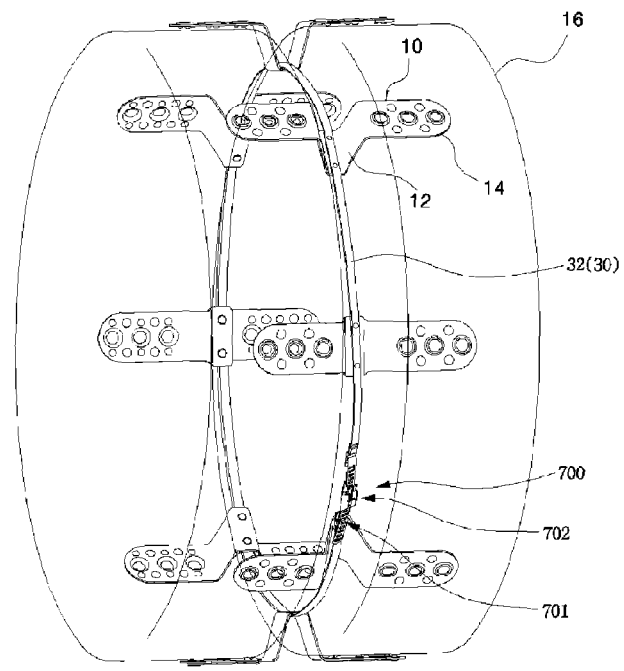
[Fig. 28]
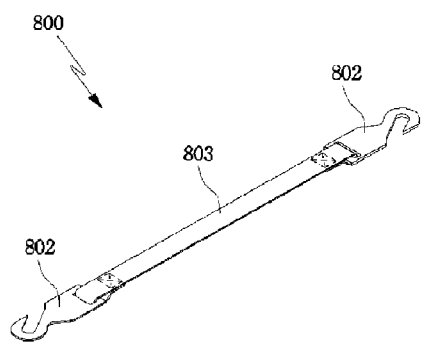
[Fig. 29]
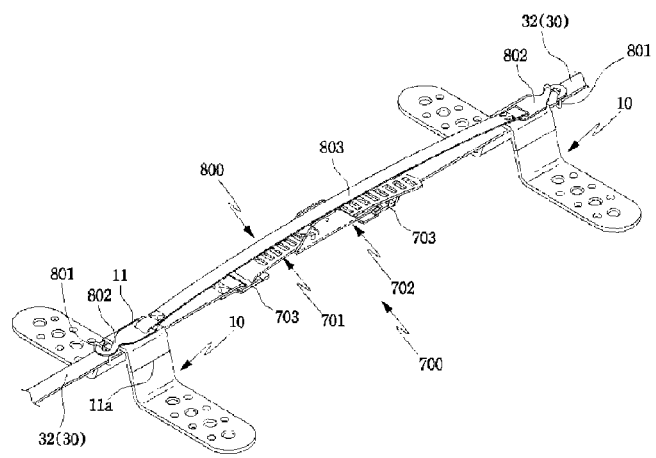

[Fig. 30]
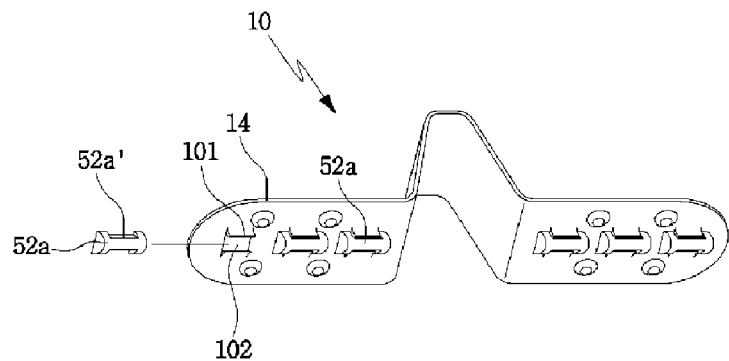
[Fig. 31]
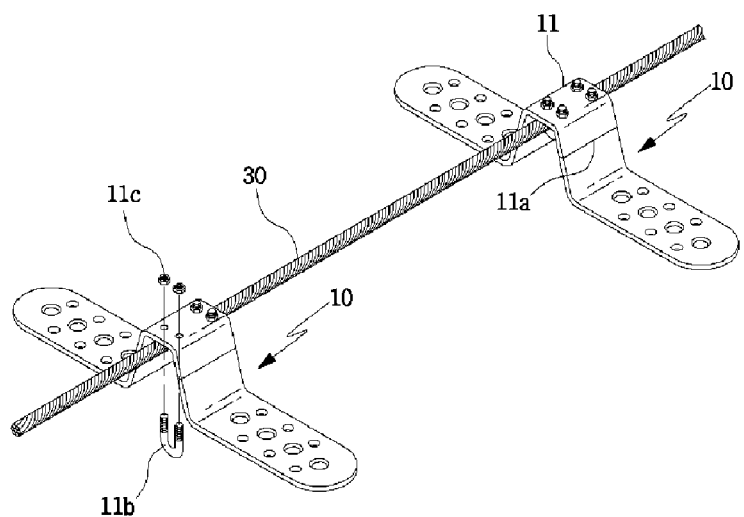
[Fig. 32]
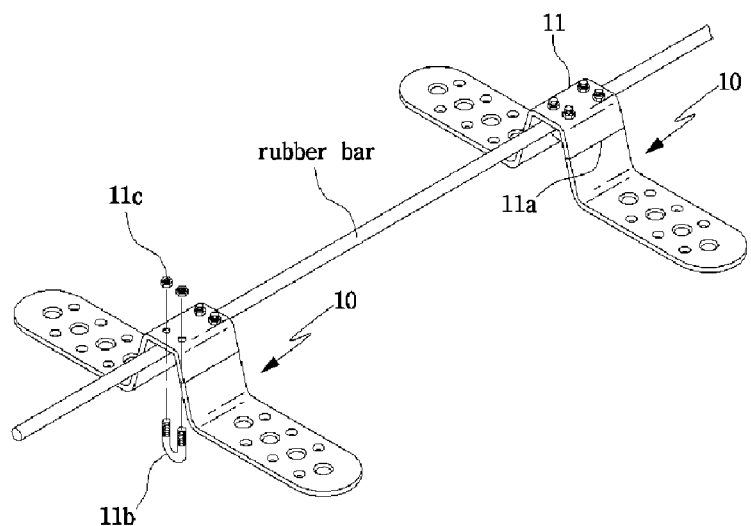

[Fig. 33]
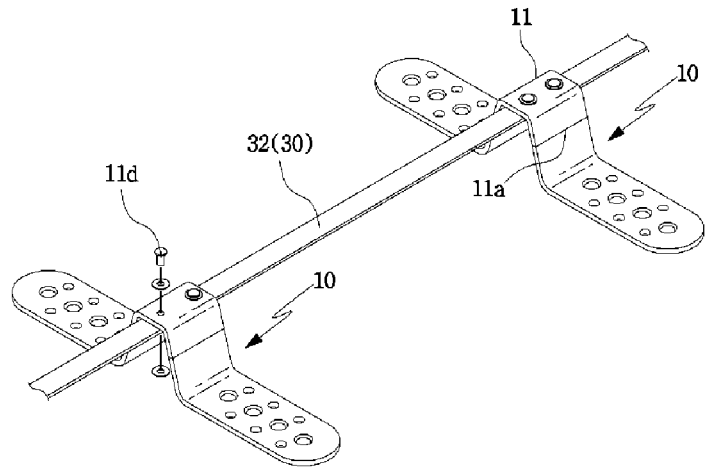
[Fig. 34]
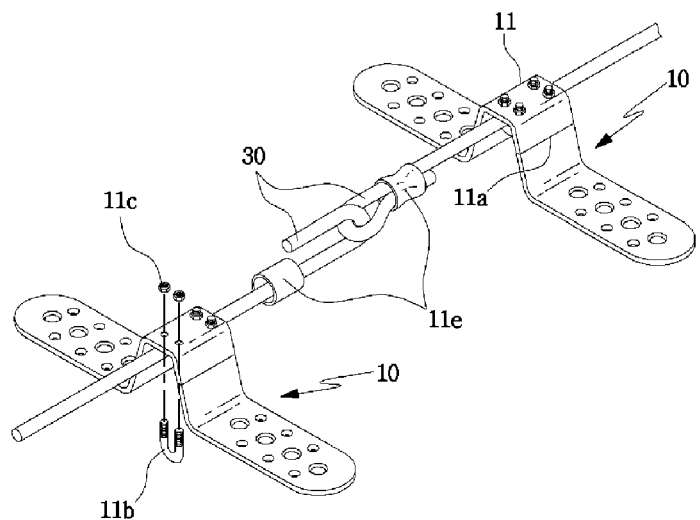
[Fig. 35]
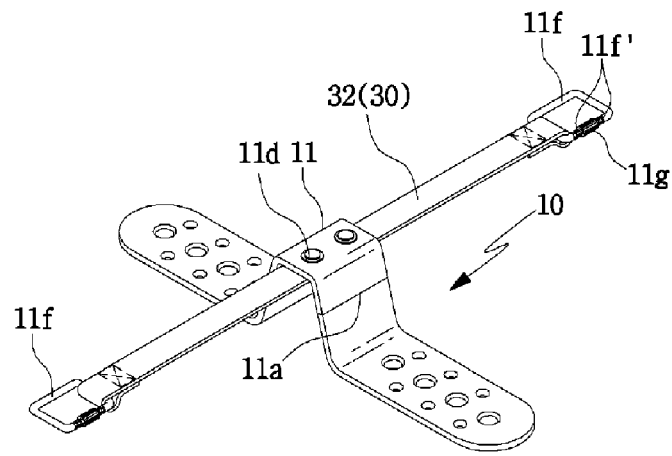

[Fig. 36]
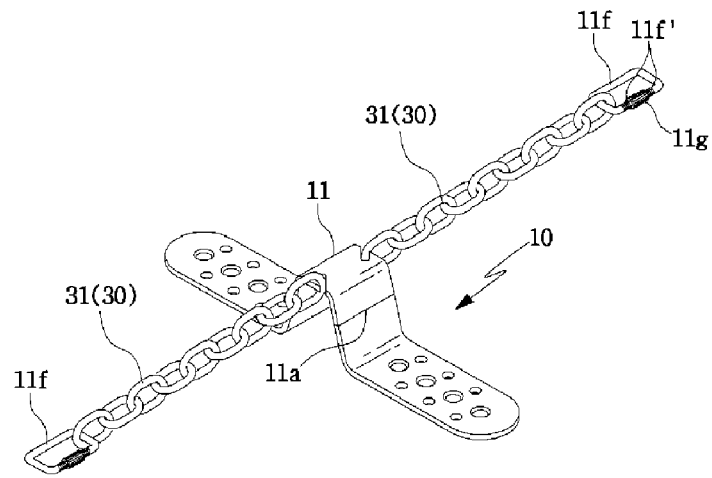
[Fig. 37]
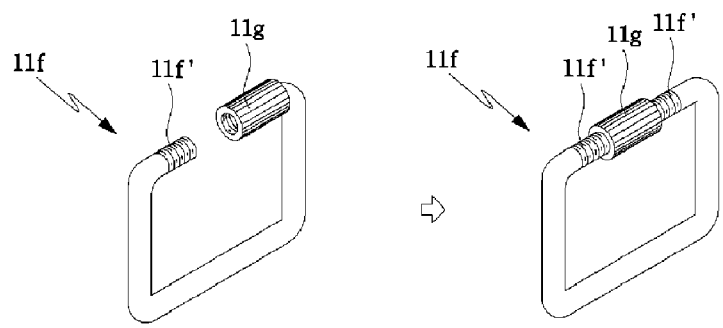
[Fig. 38]
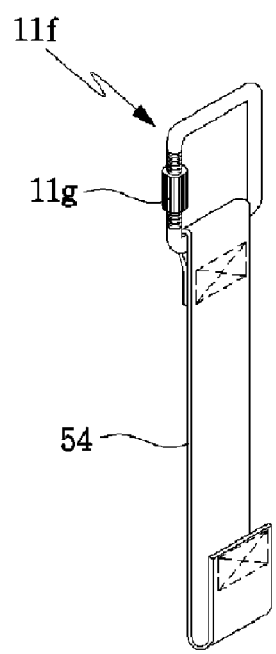

[Fig. 39]
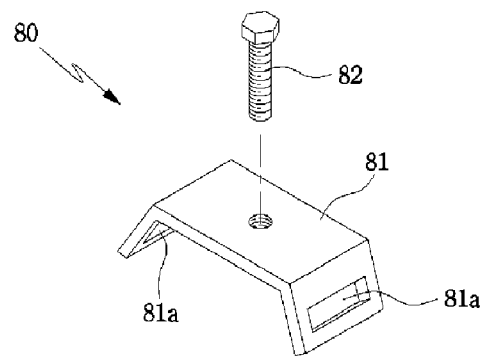
[Fig. 40]
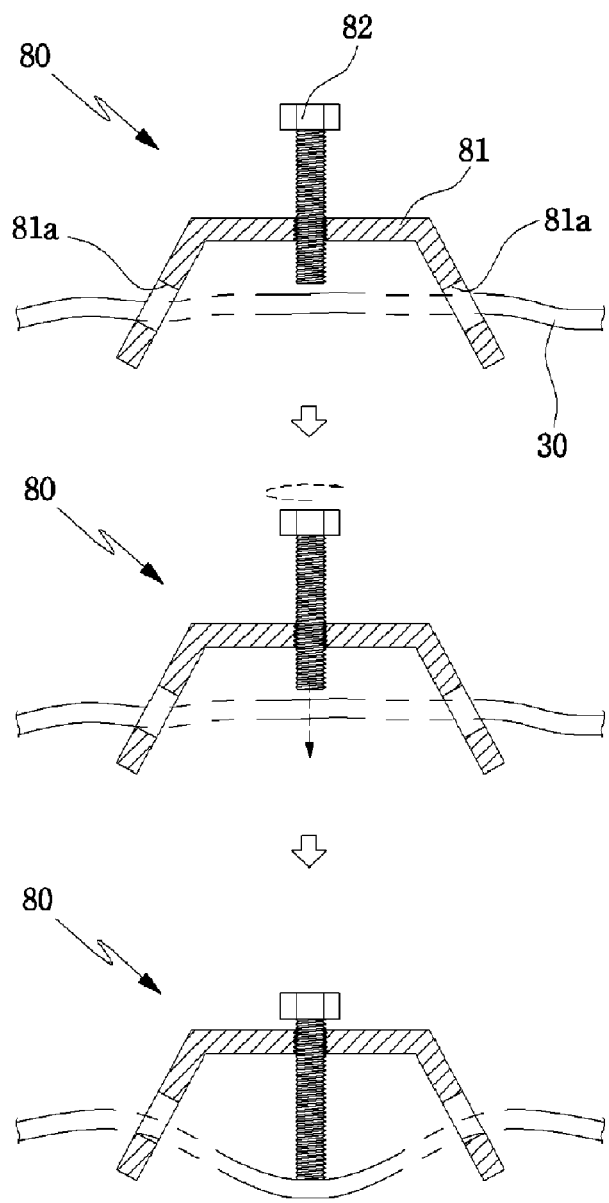

[Fig. 41]
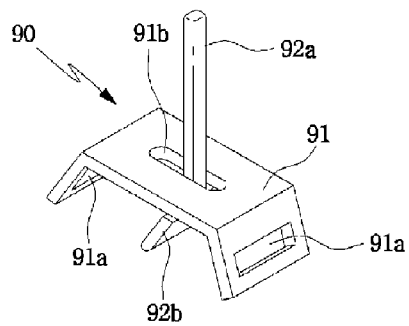
[Fig. 42]
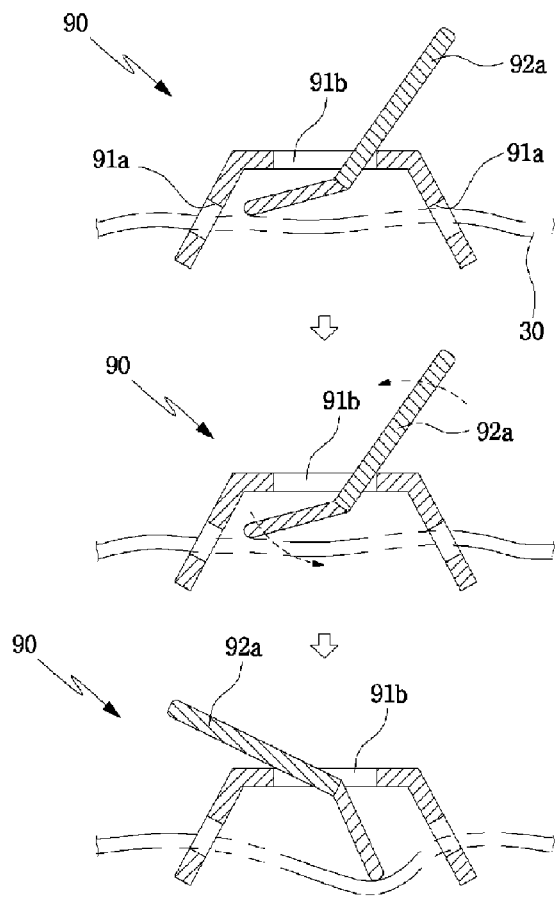
[Fig. 43]
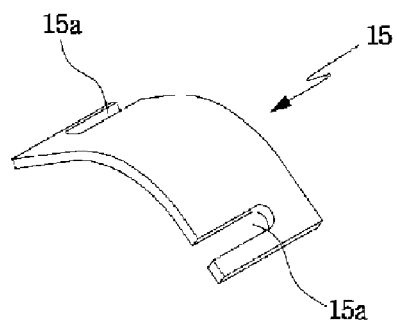

[Fig. 44]
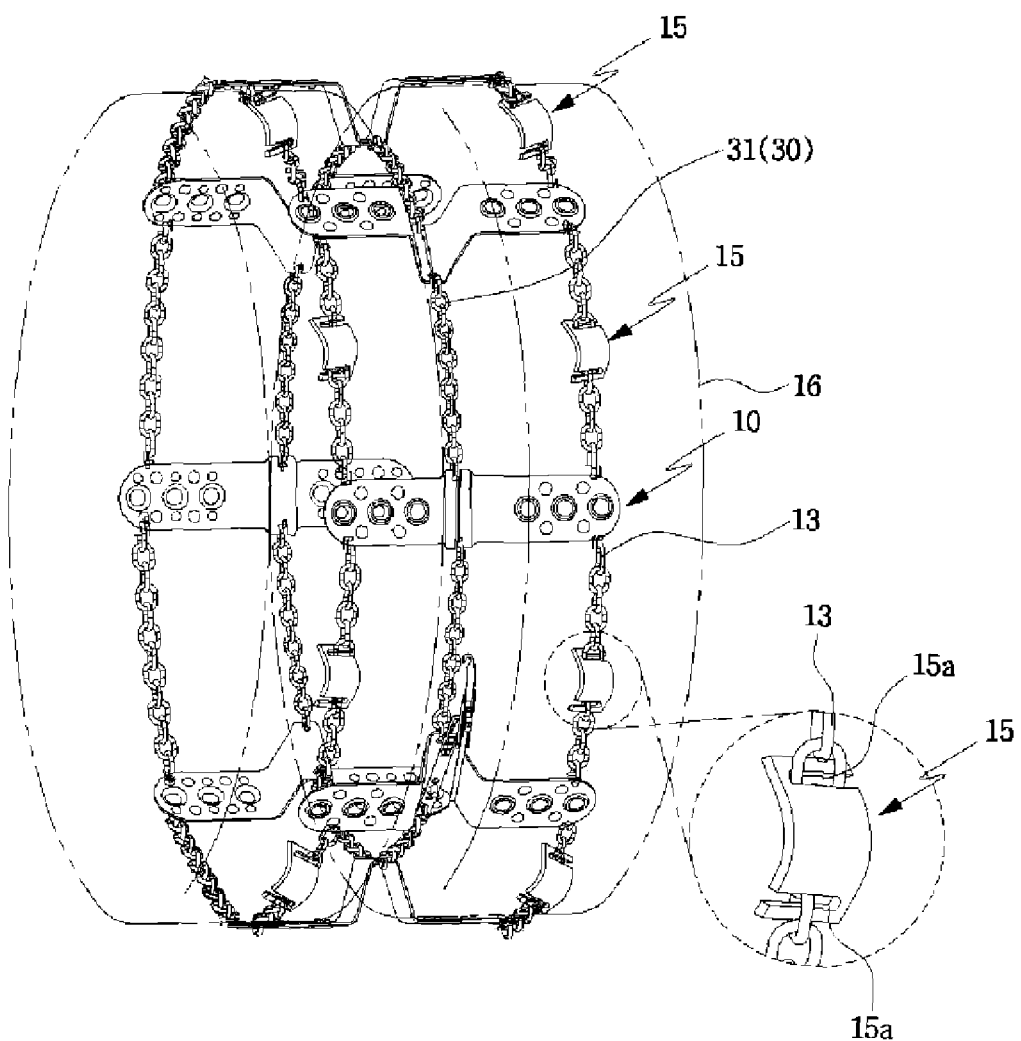

DEVICE FOR PREVENTING SLIPPING OF VEHICLE

This application is the U.S. national phase of International Application No. PCT/KR2008/001270 filed 6 Mar. 2008, which designated the U.S. and claims priority to KR Application No. 10-2007-0023109 filed 8 Mar. 2007, the entire contents of each of which are hereby incorporated by reference.

TECHNICAL FIELD

The present invention relates to a device for preventing slipping of a vehicle, and in particular to a device for preventing slipping of a vehicle which improves a vehicle slipping prevention device in which a plurality of spikes connected with a connection member are inserted into a gap between double wheels disposed at a rear side of a large size vehicle at regular intervals for preventing slipping. In the present invention, a structure contacting with a tire surface along with a spike is newly improved, and a structure of an engaging member used for maintaining the tensional force of a plurality of spikes connected by means of a connection member is newly improved. It is possible to achieve a fast and simple engaging and disengaging work and to keep a substantial tensional force so that a vehicle slipping prevention device is not disengaged even during a long time drive of a vehicle.

BACKGROUND ART

Generally, a vehicle slipping prevention device means a snow chain engaged in a tire of a vehicle for preventing a slipping of a vehicle when a vehicle runs on an iced road owing to snow. Since it is impossible to use a snow chain on a road having a high possible accident such as on a highway, a special tire such as a snow tire or a spike tire for preventing a slipping is used.

The above vehicle slipping prevention device uses a trapezoid shape chain connected by a cable or an integral type snow chain connected in a block shape by means of urethane. In the integral type vehicle slipping prevention device, when a connection ring or a connection cable is broken and disconnected, the entire fixing force of a vehicle slipping prevention device is lost, and the entire structure of a vehicle slipping prevention device may be separated from the tire. Even when not separated, it is impossible to recycle the same.

In the integral type vehicle slipping prevention device, a woman driver or a weak or disabled driver is not able to easily engage or disengage the device. When a driver meets a sudden snow or icy road, it is impossible to fast engage the device. Since it is needed to engage or disengage the device while moving the vehicle forward or backward, it is impossible to engage or disengage the device on a slanted road.

The integral type vehicle slipping prevention device is generally designed to fit with the tires of a passenger vehicle. In case of a large size bus or a truck able to carry a lot of passenger or freight, since the rear wheels, which transfer a driving force, are made in a form of double wheels (the double wheels are used for reducing a flat accident by distributing the total loads to each wheel). So, the integral type vehicle slipping prevention device has a problem for engaging to a large size vehicle which is equipped with double wheels.

In the integral type vehicle slipping prevention device, it is difficult to engage and disengage the chain. In consideration with a narrow width and small diameter of a double-wheel tire used in a freight transportation vehicle, the vehicle slipping prevention device designed for a passenger car may have a smaller fixing force or a smaller close-contacting force when it is engaged to the tires of a truck or a bus, so that it is impossible to provide an efficient driving force transfer and stop force.

In order to overcome the above problems, a new vehicle slipping prevention device is disclosed, in which a plurality of chains are engaged at a double-wheel tire belonging to a rear wheel structure of a large size truck, while passing through a center (wheel) of a tire.

However, in the above conventional vehicle slipping prevention device, a snow chain is engaged while passing through a wheel, which becomes an engaging surface of a tire, from an outer surface of the tire. So, as the tire rotates, the snow chain rotates along with the same. When a stopping force is continuously transferred to the tire which rotates at a high speed, the stopping force may be eccentrically transferred at one point with no regular interval. Namely, it is focused in one direction, so that it fails to transfer a constant braking force to the double wheels. In this case, when the total weight is focused on the snow chain, the chains may be damaged or disengaged.

In the conventional vehicle slipping prevention device, when a vehicle runs, the weights are focused on the device, and the engaged portions of the fixed snow chains may be disengaged, so that the braking force sharply loses, and a large accident may occur. Namely, the stability of the conventional device is largely decreased.

Since the conventional vehicle slipping prevention device is not provided with a member for maintaining the intervals, a plurality of spikes are directly engaged to the double wheel. When a vehicle runs on a non-uniform ground, the snow chains may be gathered at one side and may be tangled, so that the braking force may be applied in a centrifugal force direction owing to the sudden cornering operation or the vehicle is steered in a certain direction opposite to the direction that the driver steers, so an accident may occur.

In order to overcome the above problems of the conventional device, the same applicant as the present invention disclosed a vehicle slipping prevention device in which a plurality of spikes are connected with the chain and are inserted between the space between the double wheels at regular intervals (Korean patent registration number 10-0526439 (Oct. 28, 2005), and disclosed another vehicle slipping prevention device (Korean patent application number 10-45946 (May 23, 2006)) which improves the problems of the above registration patent.

However, the vehicle slipping prevention device filed by the same applicant as the present invention has the following problems.

Namely, when a vehicle runs, the spikes connected with the chains are inserted into the space between the double tires. A certain engaging member, which is used for engaging the above spikes with a certain tensional force, may be disengaged by means of vibrations occurring when the vehicle runs or by means of a centrifugal force. So, the chain and spikes may be disengaged.

In addition, when a vehicle runs a long distance or runs on a snow road or a unpaved road, a lot of abrasion may occur in the surfaces of the spikes.

DISCLOSURE OF INVENTION

Technical Problem

In the objects of the present invention, the construction that a plurality of spikes connected with a connection member for preventing slipping and inserted into a space between the double wheels belonging to a rear wheel structure of a large size vehicle is improved.

i) A tungsten or titanium rod is riveted into each spike for thereby preventing an abrasion of spikes.

ii) A structure of an engaging member able to engage the spikes connected with the connection member is provided with a locking member able to prevent escape.

iii) A structure of engaging a plurality of spikes connected with a connection member is improved to a structure having a stripe shape belt and a tilting member, thus providing an easier engaging and disengaging work and maintaining a tight tensional force with respect the spikes.

iv) A position change and vibrations owing to a rotation of double wheels are prevented by allowing the spikes to closely contact with the double wheels by tilting and separating a connection member. Noises are decreased, and only parts needing a change and maintenance during a change and maintenance are removed, so that it is possible to save a part change cost and to obtain an easier handling.

v) A driving force is enhanced while preventing slipping and subsidence when a vehicle runs on a deep subsidence state by forming an auxiliary chain and a subsidence prevention piece in the spikes.

vi) It is possible to prevent part of the connection member from being loosened and to prevent the concentration of over tensional force by providing an uniform tensional force to the connection member wound on the double wheel as one or more tensional force members are provided.

vii) A wide applicability is obtained as the connection member is made of a chain, metallic wire, rope bar, rubber bar, belt or something. It is possible to easily and fast engage or disengage the spikes on an iced road, desert, fens or something as the user optionally selects the product depending on various environments while obtaining a light product. It is possible to minimize the possibility of accidents by providing a stable performance and stop performance.

Technical Solution

To achieve the above objects, according to a first embodiment of the present invention, there is provided a vehicle slipping prevention device which comprises a plurality of spikes formed of an insertion member of which an intermediate portion is a V-shaped for being inserted into a space formed between double wheels and a close contact member which is closely flat-contacted with both sides the insertion member for a close contact with the surface of each tire of the double wheels; a connection member which connects the insertion member of the spikes; a shaft which is protruded from an outer surface of the insertion member of the last spike among a plurality of the spikes; a connection part in which a plurality of engaging holes are formed at regular intervals in a certain section of one side for inserting the shaft of the last spike, and a length adjusting member is formed at a regular interval in a certain section of the other side, and a ring is formed at one end of the engaging hole for connecting with the connection member connected with the first spike among a plurality of the spikes; and an engaging member which engages the connection member and the connection part; wherein the engaging member includes a pair of longitudinal first and second support plates; a hook which is integrally formed at an end of each of the first and second support plates and is hooked by the connection member; a longitudinal tightening member which is disposed in a space between the other sides of the first and second support plates, with an intermediate portion of the tightening member being engaged by means of a hinge; a tensional force maintaining member of which one end is engaged at an inner end of the tightening member with a hinge, and an engaging ring is integrally bent at the other end of the same; a locking member which is rotatably hinged at an upper surface of the tightening member near the hinge; and a locking groove which is formed in a concave shape on the upper sides of the first and second support plates, so that the both ends of the locking member are inserted into the same and are engaged by the same.

To achieve the above objects, according to a second embodiment of the present invention, there is provided a vehicle slipping prevention device which comprises a plurality of spikes formed of an insertion member of which an intermediate portion is a V-shaped for being inserted into a space formed between double wheels and a close contact member which is closely flat-contacted with both sides the insertion member for a close contact with the surface of each tire of the double wheels; a connection member which connects the insertion member of the spikes; a shaft which is protruded from an outer surface of the insertion member of the last spike among a plurality of the spikes; a connection part in which a plurality of engaging holes are formed at regular intervals in a certain section of one side for inserting the shaft of the last spike, and a length adjusting member is formed at a regular interval in a certain section of the other side, and a ring is formed at one end of the engaging hole for connecting with the connection member connected with the first spike among a plurality of the spikes; and an engaging member which engages the connection member and the connection part; wherein the engaging member includes a separable hook which is separated from one end of each of the first and second support plates and is engaged to the connection means; a longitudinal tightening member which is disposed in a space between the other ends of the first and second support plates, with an intermediate portion of the same being engaged with a hinge; a tensional force maintaining member of which one end is engaged at an inner end of the tightening member with a hinge; a separable engaging ring which is separable from an end of the tensional force maintaining member; first and second belt engaging holes in which the separable hook and the separable engaging ring are formed at the separated positions; and a belt which connects the first and second belt engaging holes, with the separable hook and the separable engaging ring being inserted into the belt.

To achieve the above objects, according to a third embodiment of the present invention, there is provided a vehicle slipping prevention device which comprises a plurality of spikes formed of an insertion member of which an intermediate portion is a V-shaped for being inserted into a space formed between double wheels and a close contact member which is closely flat-contacted with both sides the insertion member for a close contact with the surface of each tire of the double wheels; a connection member which connects the insertion member of the spikes; a shaft which is protruded from an outer surface of the insertion member of the last spike among a plurality of the spikes; a connection part in which a plurality of engaging holes are formed at regular intervals in a certain section of one side for inserting the shaft of the last spike, and a length adjusting member is formed at a regular interval in a certain section of the other side, and a ring is formed at one end of the engaging hole for connecting with the connection member connected with the first spike among a plurality of the spikes; and an engaging member which engages the connection member and the connection part; wherein the engaging member includes a belt having a certain length; a rectangular plate shaped tilting plate in which a belt through hole, into which the belt is inserted, is formed at a lower end of the same, with an engaging ring being engaged to a protrusion protruded from its upper side with a hinge; a separable hook which is engaged to an end of the belt; and a separable engaging ring which is engaged to the other end of the belt.

To achieve the above objects, according to a fourth embodiment of the present invention, there is provided a vehicle slipping prevention device which comprises a plurality of spikes formed of an insertion member of which an intermediate portion is a V-shaped for being inserted into a space formed between double wheels and a close contact member which is closely flat-contacted with both sides the insertion member for a close contact with the surface of each tire of the double wheels; a connection member which connects the insertion member of the spikes; a shaft which is protruded from an outer surface of the insertion member of the last spike among a plurality of the spikes; a connection part in which a plurality of engaging holes are formed at regular intervals in a certain section of one side for inserting the shaft of the last spike, and a length adjusting member is formed at a regular interval in a certain section of the other side, and a ring is formed at one end of the engaging hole for connecting with the connection member connected with the first spike among a plurality of the spikes; and an engaging member which engages the connection member and the connection part; wherein the engaging member includes a belt having a certain length; a rectangular plate shaped tilting plate in which a belt through hole, into which the belt is inserted, is formed at a lower end of the same, with a T-shaped fixing member being integrally formed at its upper side; a separable hook which is engaged to an end of the belt; a separable engaging ring which is engaged to the other end of the belt; a rectangular ring shaped engaging ring which is movably inserted into the belt extended in a direction of the separable engaging ring through the belt through hole; and an engaging hole which is formed in an inner diameter surface of the engaging ring for fixedly inserting the T-shaped fixing member into the same.

To achieve the above objects, according to a fifth embodiment of the present invention, there is provided a vehicle slipping prevention device which comprises a plurality of spikes formed of an insertion member of which an intermediate portion is a V-shaped for being inserted into a space formed between double wheels and a close contact member which is closely flat-contacted with both sides the insertion member for a close contact with the surface of each tire of the double wheels; a connection member which connects the insertion member of the spikes; a shaft which is protruded from an outer surface of the insertion member of the last spike among a plurality of the spikes; a connection part in which a plurality of engaging holes are formed at regular intervals in a certain section of one side for inserting the shaft of the last spike, and a length adjusting member is formed at a regular interval in a certain section of the other side, and a ring is formed at one end of the engaging hole for connecting with the connection member connected with the first spike among a plurality of the spikes; and an engaging member which engages the connection member and the connection part; wherein the engaging member includes an operation member in which longitudinal holes are formed in both side pieces of the upper and lower handles at slanted angles, and fixing plates having fixing shoulders are forwardly fixed by means of the elastic forces of the springs, and a support shoulder and a fixing groove are formed in an inner outer side of the lower handle, and a circular protrusion being larger than a radius size of the latchet having a spaced-apart engaging hole is formed in an inner outer side of the upper handle, and a latchet is inserted the upper and lower handles and their inner ends with a semicircular winding rod; a belt of which one end is wound on the winding rod through the upper handle, and the other end is engaged with the separable hook; and a belt of which one end is engaged to the lower handle, and the other end is engaged with the separable engaging ring.

To achieve the above objects, according to a sixth embodiment of the present invention, there is provided a vehicle slipping prevention device which comprises a plurality of spikes formed of an insertion member of which an intermediate portion is a V-shaped for being inserted into a space formed between double wheels and a close contact member which is closely flat-contacted with both sides the insertion member for a close contact with the surface of each tire of the double wheels; a connection member which connects the insertion member of the spikes; a shaft which is protruded from an outer surface of the insertion member of the last spike among a plurality of the spikes; a connection part in which a plurality of engaging holes are formed at regular intervals in a certain section of one side for inserting the shaft of the last spike, and a length adjusting member is formed at a regular interval in a certain section of the other side, and a ring is formed at one end of the engaging hole for connecting with the connection member connected with the first spike among a plurality of the spikes; and an engaging member which engages the connection member and the connection part; wherein the engaging member includes an engaging member of which one end is formed of a plurality of engaging protrusions, and the other end is formed of an engaging hole; an engaging body in which an engaging piece engaged by the engaging protrusion along with an elastic support by a torsion spring is formed at an upper side of the insertion space formed at one end of the same for an insertion of the engaging member, with the other end of the same being formed of an engaging hole; a belt of which one end is engaged to the engaging hole of the engaging member, and the other end is engaged with the separable hook; and a belt of which one end is engaged to the engaging hole of the engaging body, and the other end is engaged with the separable engaging ring.

To achieve the above objects, according to a seventh embodiment of the present invention, there is provided a vehicle slipping prevention device which comprises a plurality of spikes formed of an insertion member of which an intermediate portion is a V-shaped for being inserted into a space formed between double wheels and a close contact member which is closely flat-contacted with both sides the insertion member for a close contact with the surface of each tire of the double wheels; a connection member which connects the insertion member of the spikes; a shaft which is protruded from an outer surface of the insertion member of the last spike among a plurality of the spikes; a connection part in which a plurality of engaging holes are formed at regular intervals in a certain section of one side for inserting the shaft of the last spike, and a length adjusting member is formed at a regular interval in a certain section of the other side, and a ring is formed at one end of the engaging hole for connecting with the connection member connected with the first spike among a plurality of the spikes; and an engaging member which engages the connection member and the connection part; wherein the engaging member includes an engaging member which has an engaging hook member of which one end is formed of an insertion member, and the other end is connected to the connection member, with a plurality of engaging holes being formed between the engaging hook member and the insertion member in a row; an engaging body which has a bottom piece formed of an engaging hook member connected with a connection member at one end in a U shape so that the insertion member of the engaging member is inserted, a fixing pin hole for engaging a fixing pin with respect to the engaging hook member at both sides of the bottom piece, a body in which rotation pin holes engaged with the rotation pin are sequentially formed on a wall plate, and an engaging piece which is fixed at an upper side of the rotation pin and is connected with the tensional spring connected with the fixing pin and performs a rotation and return operation, and is formed of an engaging member which is downwardly protruded for an engagement by the engaging hole; and a connection ring which is provided at each end of the connection member for connecting the engaging hook member of the engaging member and the engaging hook member of the engaging body.

In a preferred embodiment, there is further provided an auxiliary engaging member in which a connecting ring is engaged to the connection member in a backward direction of the spike positioned at both sides of the engaging member for preventing a loosening phenomenon of the engaging member, with the auxiliary engaging member being formed of a contractive band having a separable hook at both ends for a connection to the connection ring.

In a preferred embodiment, a plurality of holes are formed on a surface of the spike, and a reinforcing protrusion riveted with a tungsten or titanium rod is formed in the hole.

In a preferred embodiment, a plurality of cut holes corresponding to the cut pieces are formed on a surface of the spike, and a semicircular cylindrical reinforcing protrusion is formed between the cut pieces.

In a preferred embodiment, the belt through holes formed on the tilting plate is formed in a stacked structure by multiple holes for adjusting a tilting position and a tilting force of the tilting plate, and each belt through hole communicates with the interval adjusting member so that the position is adjusted as the belt passes.

In a preferred embodiment, there is further provided an elastic pin which is provided at a portion opposite to the engaging ring attached to an upper side of the tilting plate for preventing an escape of the engaging ring.

In a preferred embodiment, an upper side of the tilting plate is outwardly curved at 3~5° with respect to the position before the tilting is performed.

In a preferred embodiment, both ends of the belt are covered with a metallic protection cap or are coated with a coating layer coated with a heterogeneous material having an abrasion resistance.

In a preferred embodiment, the engaging hole of the engaging ring fixed as the T-shaped fixing member is inserted is a hole for inserting the belt into the same and is provided with a concave engaging groove in which a neck part of the T-shaped fixing member is inserted.

In a preferred embodiment, the connection member is formed of a chain.

In a preferred embodiment, the connection member is formed of one among a metallic wire, a rope bar and a rubber bar, and a friction rubber pad formed of a FRP or urethane is covered on the upper surface of the spike, and a metallic wire, a rope bar and a rubber bar pass through the U-shaped clamp, and a nut is engaged and fixed.

In a preferred embodiment, the connection member is formed of a belt and is fixed by a method of using a rivet for an engagement with the spike having a friction rubber pad.

In a preferred embodiment, a metallic wire, a rope bar and a rubber bar, which connect the spikes, form a ring shape by connecting each end of the same and are connected with a knot connection tightening clamp.

In a preferred embodiment, the both ends having threads of the belt used for connecting the spikes are connected by means of a C-shaped clamp which is opened and closed by an opening and closing member for a bending and separation.

In a preferred embodiment, the both ends having threads of the separable hook and the separable engaging ring are formed of the C-shaped clamp which is opened and closed by means of the opening and closing member.

In a preferred embodiment, there are provided a tensional force member formed of a through hole at their both ends with a connection member passing through the through hole for generating and providing a tensional force to the connection member for closely contacting the spike to the wheels, and a tensional force adjusting member which is engaged with a tensional force bolt for pressing the connection member which passes through the center of the tensional force member in the up and down directions.

In a preferred embodiment, there are provided a tensional force member which has a movable longitudinal hole at its center upper portion, with a through hole for passing the connection means being formed at both sides of the tensional force member for providing a tensional force to the connection member for closely contacting the spike to the wheels, and a tensional force adjusting member which has a tensional force bar provided with a handle and a support piece for pressing the connection member based on a tilting operation as the tensional force adjusting member is inserted into the longitudinal movable hole $91b$ of the tensional force member.

In a preferred embodiment, an auxiliary chain is connected to an end of each of the spikes, and a V-shaped subsidence prevention piece is provided with an insertion groove at its both ends for an engagement to the auxiliary chain.

Advantageous Effects

As described above, the vehicle slipping prevention device according to the present invention has the following advantages.

1) It is possible to prevent an abrasion of spikes by riveting a rod made of tungsten or titanium in the spikes.

2) The structure of an engaging member able to engage a plurality of spikes connected with a connection member is changed to the structure having a locking member which is able to prevent disengagement. So, it is possible to prevent the loosening of an engaging member irrespective of the vibrations occurring as the vehicle runs.

3) The structure of an engaging member able to engage a plurality of spikes connected with a connection member is changed to a structure having a stripe shaped belt and tilting member, so that an easier engaging and disengaging work is implemented. Even a lot of vibrations occurring as the vehicle runs do not affect loosening. It is possible to maintain a tightened tensional force with respect to a plurality of spikes.

4) The spikes are closely contacted with the double wheels so that the connection member can be bent and separated, so that a position change and vibrations owing to the rotation of double wheels do not occur. The noises are reduced. Only the part, which needs a change or maintenance, can be removed, so that the cost needed for part change and maintenance can be significantly saved.

5) The auxiliary chain and subsidence prevention piece are provided in the spikes, so that when a vehicle runs on a road having a lot of subsidence, a slipping and subsidence are prevented, and a driving force is enhanced.

6) Since one or more tensional force adjusting members are provided, a uniform tensional force can be supplied to the connection member wound on the double wheels, so that it is possible to prevent part of the connection member from being loosened or to prevent an over tensional force from being concentrated.

7) The connection member is made of a chain, metallic wire, rope bar, rubber bar, belt or something, so its applicability is enhanced. Various kinds of light products can be manufactured depending on the given environments.

The engaging member can be fast engaged under a bad condition such as an icy road, snow road, desert, fens or rail road while preventing an easier disengagement of the same. A stable running performance and a braking reliability of the spikes are obtained in the present invention for thereby minimizing the possibility of slipping accident.

BRIEF DESCRIPTION OF THE DRAWINGS

The present invention will become better understood with reference to the accompanying drawings which are given only by way of illustration and thus are not limitative of the present invention, wherein;

FIG. 1 is a perspective view illustrating a construction of a spike and connection member of a vehicle slipping prevention device and its exploded state in a longitudinal direction according to the present invention;

FIG. 2 is a cross sectional view illustrating a spike of a vehicle slipping prevention device according to the present invention;

FIGS. 3 and 4 are perspective views illustrating a first engaging member of a vehicle slipping prevention device according to the present invention;

FIG. 5 is a perspective view illustrating a use state of a first engaging member of a vehicle slipping prevention device according to the present invention;

FIGS. 6 and 7 are views illustrating a state that a vehicle slipping prevention device is installed according to the present invention, of which FIG. 6 is a view illustrating a state that a connection member is wound on a double wheel tire and is temporarily engaged to a shaft of the last spike, and FIG. 7 is a perspective view illustrating a state that the connection member is fully lock-engaged using a first engaging member;

FIGS. 8 and 9 are perspective views illustrating a second engaging member and its use state of a vehicle slipping prevention device according to the present invention;

FIGS. 10 and 11 are perspective views illustrating a third engaging member of a vehicle slipping prevention device according to the present invention;

FIG. 12 is a front view illustrating an example of a belt through hole formed in a tilting member of a third engaging member of a vehicle slipping prevention device according to the present invention;

FIG. 13 is a cross sectional perspective view illustrating an example of a belt of a third engaging member of a vehicle slipping prevention device according to the present invention;

FIG. 14 is a perspective view illustrating a use state of a third engaging member of a vehicle slipping prevention device according to the present invention;

FIGS. 15 and 16 are perspective views illustrating a construction that a vehicle slipping prevention device is installed in a double wheel tire by using a third engaging member according to the present invention;

FIGS. 17 and 18 are perspective views illustrating a fourth engaging member and its use state of a vehicle slipping prevention device according to the present invention;

FIGS. 19 and 20 are views illustrating a disassembled perspective view and an operation state of a fifth engaging member of a vehicle slipping prevention device according to the present invention;

FIGS. 21 through 23 are a disassembled perspective view, an engaged perspective view and its use state of a sixth engaging member of a vehicle slipping prevention device according to the present invention;

FIGS. 24 through 27 are a disassembled perspective view, a use state engaged perspective view, and an engaging sequence cross sectional view of a seventh engaging member and its installation in a double wheel tire of a vehicle slipping prevention device according to the present invention;

FIGS. 28 and 29 are a perspective view and a use state perspective view illustrating an auxiliary engaging member which supports a seventh engaging member according to the present invention;

FIG. 30 is a perspective view illustrating a use state of a reinforcing protrusion according to another embodiment of the present invention;

FIGS. 31 and 32 are perspective views illustrating an engagement of a metallic wire rope, a rope bar, a rubber bar and a spike according to the present invention;

FIG. 33 is a perspective view illustrating an engagement of a belt and a spike according to the present invention;

FIGS. 34 and 36 are perspective views illustrating a tilting and separation structure of a connection member according to the present invention;

FIG. 37 is a perspective view illustrating an operation state of a C-shaped clamp according to the present invention;

FIG. 38 is a perspective view illustrating a construction that a hook and separation type engaging ring is substituted with a C-shaped clamp according to another embodiment of the present invention;

FIGS. 39 and 40 are a perspective view and an operation state view of a tension force adjusting member;

FIGS. 41 and 42 are a perspective view and an operation state view of a tension force adjusting member according to another embodiment of the present invention; and FIGS. 43 and 44 are a perspective view of a subsidence prevention piece according to the present invention.

BEST MODE FOR CARRYING OUT THE INVENTION

In the present invention, a vehicle slipping prevention device comprises a plurality of spikes 10 formed of an insertion member 12 of which an intermediate portion is a V-shaped for being inserted into a space formed between double wheels 16 and a close contact member 14 which is closely flat-contacted with both sides the insertion member 12 for a close contact with the surface of each tire of the double wheels 16; a connection means 30 which connects the insertion member 12 of the spikes 10; a shaft 20 which is protruded from an outer surface of the insertion member 12 of the last spike 10n among a plurality of the spikes 10; a connection part 32a in which a plurality of engaging holes 34 are formed at regular intervals in a certain section of one side for inserting the shaft of the last spike 10n, and a length adjusting member 36 is formed at a regular interval in a certain section of the other side, and a ring 38 is formed at one end of the engaging hole 34 for connecting with the connection means 30 connected with the first spike 10a among a plurality of the spikes 10; and an engaging member which engages the connection means 30 and the connection part 32a; wherein said engaging member 100 which includes a pair of longitudinal first and second support plates 42 and 43; a hook 44 which is integrally formed at an end of each of the first and second support plates 42 and 43 and is hooked by the connection means 30; a longitudinal tightening member 46 which is disposed in a space between the other sides of the first and second support plates 42 and 43, with an intermediate portion of the tightening member being engaged by means of a hinge 45; a tensional force maintaining member 48 of which one end is engaged at an inner end of the tightening member 46 with a hinge 47, and an engaging ring 49 is integrally bent at the other end of the same; a locking member 50 which is rotatably hinged at an upper surface of the tightening member 46 near the hinge 47; and a locking groove 51 which is formed in a concave shape on the upper sides of the first and second support plates 42 and 43, so that the both ends of the locking member 50 are inserted into the same and are engaged by the same.

MODE FOR THE INVENTION

The preferred embodiment of the present invention will be described with reference to the accompanying drawings. The same elements are given the same reference numerals.

FIG. 1 is a perspective view illustrating a construction of a spike and connection member of a vehicle slipping prevention device and its exploded state in a longitudinal direction according to the present invention.

As shown in FIG. 1, the spikes 10 are connected, and the numbers of the spikes 10 are determined depending on the diameters of the double wheel tires. When each spike 10 and connection member 30 are unfolded in a row, each spike 10 and connection member 30 can be arranged in a row. A connection part 32a is connected to the connection member 30 connected to the first spike 10a.

The spike 10 is formed of an insertion member 12 of which an intermediate portion is bent in a V shape so that it is inserted into a space between the double wheel tire belonging to a rear wheel structure of a large size truck, and a close contact member 14 which is integrally flat at both sides of the insertion member 12 closely to the surface of each tire.

As shown in FIG. 2, a plurality of holes are formed on the surface of the spike 10, and a reinforcing protrusion 52 is formed in each hole by riveting a tungsten or titanium rod for thereby preventing an abrasion of the spike 10.

The connection part 32a is formed in a longitudinal rectangular board shape. A shaft of the last spike 10n is inserted into a certain section of one side end, and a plurality of circular engaging holes 34 are formed at regular intervals, and a rectangular length adjusting member 36 is formed at a certain section of the other end side for assembling each engaging member 100, 200, 300, 400, 500, 600 and 700 provided in various shapes at regular intervals.

A ring 38 is formed at an end of the engaging hole 34 of the connection part 32a for fixing the connection member 30 connected to the first spike 10a among a plurality of spikes. The connection member 30 is inserted into the ring 38, and the ring 38 is hit, so that the connection member 30 is not escaped.

When the vehicle slipping prevention apparatus of the present invention is installed in the double wheel tire, each spike 10 is inserted into a space between the double wheel tires, and the close contact member 14 closely contacts with the surfaces of the tires. Here, The shaft 20 of the last spike 10n is inserted into the engaging hole 34 of the connection member, and the spikes are connected using each engaging member 100, 200, 300, 400, 500, 600 and 700.

The engaging structure and method by using the engaging members after the vehicle slipping prevention device of the present invention is installed in the double wheel tires will be described.

The construction of the engaging member and their engaging method according to a first embodiment of the present invention will be described.

FIGS. 3 and 4 are perspective views illustrating a first engaging member of a vehicle slipping prevention device according to the present invention, and FIG. 5 is a perspective view illustrating a use state of a first engaging member of a vehicle slipping prevention device according to the present invention.

The first engaging member 100 comprises a pair of first and second support plates 42 and 43 arranged in parallel at both sides of a longitudinal rectangular plate, a hook 44 which is integrally formed at each end of the first and second support plates 42 and 43 and is hooked at the chain 31 of the connection member 30, a longitudinal tightening member 46 which is disposed between the space of the other ends of the first and second support plates 42 and 43 with its intermediate portion being engaged by a hinge 45, and an integrally bent tensional force maintaining member 48 of which one end is engaged to an inner end of the tightening member 46 with the hinge 47, and with an engaging ring 49 being engaged by the length adjusting member 36 of the connection part 32a.

In particular, a locking member 50 is rotatably provided on an upper surface of the tightening member 46 near the hinge 47 by means of the hinge 53. When the locking member 50 is rotated in a direction vertical to the longitudinal direction of the tightening member 46, the both ends of the locking member 50 are inserted into a locking groove 51 formed on the upper surfaces of the first and second support plates 42 and 43.

The spike and connection member of the present invention are installed in the double wheel, and the operations for the first engaging member will be described step by step with reference to FIGS. 6 and 7.

There are provided a step in which the connection part 32a is forwardly pushed from the lower back side of the double wheel 16; a step in which the spikes 10 surround the outer diameter of the double wheel 16, and the insertion member 12 of each spike 10 is inserted into the space between the double wheels 16, and the close contact member 14 closely contacts with the surface of the tire; a step in which the connection part 32a is wound toward the last spike 10n positioned at the front side of the double wheels 16, and the shaft 20 of the last spike 10n is inserted into the engaging hole 34 of the connection part 32a; and a step in which the hook 44 of the first engaging member 100 is engaged to one among the chains 31 positioned before the last spike 10n, and the engaging ring 49 of the tensional force maintaining member 48 of the first engaging member 100 is engaged to the length adjusting member 36 of the connection part 32a, and the tightening member 46 is pressurized into the space between the first and second support plates 42 and 43.

Namely, the tightening member 46 is rotated about the engaging point of the hinge 45 and is pressurized into the space between the first and second support plates 42 and 43, and the tensional force maintaining member 48 is pulled, and the joint portion of the hinge 47 between the tensional force maintaining member 48 and the tightening member 46 is positioned between the first and second support plates 42 and 43. As a result, a tight tensional force is maintained between the connection member 30 positioned before the last spike 10n hooked by the hook 44 of the first engaging member 100 and the length adjusting member 36 of the connection part 32a engaged by the engaging ring 49 of the tensional force maintaining member 48 of the first engaging member 100.

At this time, the tightening member 46 lifts up by the vibrations occurring when the vehicle runs, and the tensional force maintaining member 48 is rotated downwards, so that the engaged state, namely, the locked state may be loosened. In order to prevent the loosening state, there are provided a locking member 50 and a locking groove 51 as a locking releasing prevention member.

The locking member 50 is rotated to be vertical with respect to the longitudinal direction of the tightening member 46, and the both ends of the locking member 50 are inserted into the locking groove 51 for thereby obtaining a locked state. So, the tightening member 46 lifts up by means of an impact such as vibrations or centrifugal force, and the force applied as an angular rotation when the tensional force maintaining member 48 moves downwards is blocked by means of the locked state of the locking member 50. As a result, it is possible to easily prevent the first engaging member 100 from being loosened owing to the vibrations when the vehicle runs.

The engaging member and its engaging method according to a second embodiment of the present invention will be described.

FIGS. 8 and 9 are perspective views illustrating a second engaging member and its use state of a vehicle slipping prevention device according to the present invention.

The second engaging member 200 according to the second embodiment of the present invention is similar with the first engaging member 100 of the first embodiment except that the separable hook 55 and the separable engaging ring 56 are inserted into the belt 54 in a separable structure.

The second engaging member 200 comprises a pair of longitudinal first and second support plates 42 and 43 like the first engaging member 100, a tightening member 46 which is disposed in the space between the ends of the first and second support plates 42 and 43 with its intermediate portion being engaged by a hinge 45, and a tensional force maintaining member 48 of which one end is engaged to the inner end of the tightening member 46 with a hinge 47.

The second engaging member 200 comprises a separable hook 55 which is separable from one end of each of the first and second support plates 42 and 43 and is engaged to the connection member 30, and a separable engaging ring 56 which is separable from the end of the tensional force maintaining member 48.

The first and second belt engaging holes 57 and 58 are formed at the positions in which the separable hook 55 and the separable engaging ring 56 are separated, namely, at the both ends of the second engaging member 200. The belt 54 is engaged by connecting the first and second belt engaging holes 57 and 58. The separable hook 55 and the separable engaging ring 56 are inserted into the belt 54 and are movable in a longitudinal direction.

In the engaging method of the second engaging member 200 according to the present invention, like the first engaging member 100, there are a step in which the connection part 32a is pushed forward from the rear back side of the double wheels 16; a step in which a plurality of the spikes 10 surround the outer diameter of the double wheels 16, and the insertion member 12 of each spike 10 is inserted into a space between the double wheels 16, and the close contact member 14 is closely contacted with the surfaces of the tires; and a step in which the connection part 32a is wound toward the last spike 10n positioned in front of the double wheels 16, and the shaft 20 of the last spike 10n is inserted into the engaging hole 34 of the connection part 32a. The separable hook 55 of the second engaging member 200 is engaged to one of the connection members 30 disposed before the last spike 10n. The separable engaging ring 56 of the second engaging member 200 is engaged to the length adjusting member 36 of the connection part 32a, and the tightening member 46 is pressure inserted into the space between the first and second support plates 42 and 43, so that the engagement of the second engaging member 200 is achieved.

At this time, the positions of the separable hook 55 and the separable engaging ring 56 are changeable since the separable hook 55 and the separable engaging ring 56 are movably inserted through the belt 54.

So, the separable hook 55 is movable in a longitudinal direction of the belt 54 and is engaged to the connection member 30 at a desired position, and the separable engaging ring 56 is movable in a longitudinal direction of the belt 54 and is engaged to one of the length adjusting members 36 at a desired position.

The engaging member and its engaging method according to the third embodiment of the present invention will be described.

FIGS. 10 and 11 are perspective views illustrating a third engaging member of a vehicle slipping prevention device according to the present invention. FIG. 14 is a perspective view illustrating a use state of a third engaging member of a vehicle slipping prevention device according to the present invention. FIGS. 15 and 16 are perspective views illustrating a construction that a vehicle slipping prevention device is installed in a double wheel tire by using a third engaging member according to the present invention.

The third engaging member 300 according to the third embodiment of the present invention is implemented by using a belt and a tilting plate.

Here, the belt 54 has a certain length. As shown in FIG. 13, a metallic protection cap 59 may be provided at both ends of the belt 54 for preventing abrasion. A coating layer 60 coated with a heterogeneous material having an abrasion resistance property may be formed on the same.

The tilting plate 62 is formed so that the belt 54 is inserted. Namely, the belt 54 is inserted into the belt through hole 63 formed at its lower side, and a protrusion 64 is formed at its upper side. The engaging ring 65 is rotatably engaged to the protrusion 64 with the help of the hinge.

At this time, the belt through hole 63 formed in the tilting plate 62 is formed in a stacked structure in multiple numbers for adjusting tilting position and force of the tilting plate 62. Each belt through hole 63 communicates with each other with the help of the interval adjusting member 66 which can be adjusted in multiple steps.

As shown in FIG. 12, the belt through hole 63 of the tilting plate 62 is formed in multiple steps, and each belt through hole 63 communicates with each other by means of the interval adjusting member 66 having a narrow width. As the belt 54 is moved to one among the multiple-step belt through holes 63 along the interval adjusting member 66, the position that the belt 54 passes through the tilting plate 62 is adjusted.

An elastic pin 67 is attached at a portion opposite to the engaging ring 65 attached to an upper side of the tilting plate 62 for preventing an escape of the engaging ring 65. When the engaging ring 65 engages the belt 54 and locks the same, the elastic pin 67 supports the engaging ring 65, so that the engaging ring 65 is not separated while maintaining a horizontal state for thereby continuously supporting the belt 54.

In addition, the tilting plate 62 is curved outwardly at an angle of 3~5° with respect to the position before tilting. It is closely contacted and supported along the curved surface of the double wheels 16 after tilting.

A separable hook 55 is engaged at one end of the belt 54 for engaging the connection member 30. A separable engaging ring 56 is engaged at the other end of the belt 54 for engaging the length adjusting member 36 of the connection part 32a.

The use method of the third engaging member according to the present invention will be described.

FIG. 14 is a perspective view illustrating a use state of a third engaging member of a vehicle slipping prevention device according to the present invention, and FIGS. 15 and 16 are perspective views illustrating a construction that a vehicle slipping prevention device is installed in a double wheel tire by using a third engaging member according to the present invention.

The separable hook 55 connected to one end of the belt 54 is engaged to the connection member 30, and the opposite separable engaging ring 56 is engaged to one of the length adjusting members 36 of the connection part 32*a*.

The lower side of the belt through hole 63 is lifted by holding the upper side of the tilting plate 62 and is tilted at an angle of 180°, so that the belt 54 in a row is tensely tightened, so that the belt 54 is overlapped and folded at a portion in which the belt through hole 63 is formed.

As the belt 54 is overlapped and folded, the tensional force of the belt 54 is tightened. The engaging ring 65 is horizontally hinge-moved so as to maintain a tightened tensional force, and the belt 54 is engaged from its backside.

As shown in FIG. 14(*c*), the engaging ring 65 becomes a horizontal position (in the direction opposite to the longitudinal direction of the tilting plate), and its one end is engaged to one end of the belt 54, and the tilting plate is fixed at a tilted angle of 180°.

At this time, since the elastic pin 67 is engaged to the lower side of the engaging ring 65, the engaging ring 65 does not hinge-rotate in the opposite direction, namely, continuously supports the belt 54 without separation.

The engaging member and its engaging method according to the fourth embodiment of the present invention will be described.

FIGS. 17 and 18 are perspective views illustrating a fourth engaging member and its use state of a vehicle slipping prevention device according to the present invention.

The fourth engaging member 400 is similar with the third engaging member 300, but is different from the same in its tilting structure which is an engaging member.

Namely, a belt through hole 63 is formed at a lower side of the tilting plate 62 based on the fourth engaging member 400, with a belt 54 having a certain length passing through the belt through hole 63. A T-shaped fixing member 70 is integrally formed at its upper side in a rectangular plate structure.

Like the third engaging member 300, a separable hook 55 engaged to the connection member is provided at one end of the belt 54, and a separable engaging ring 56 engaged to the length adjusting member 36 of the connection part 32*a* is engaged to the other end of the belt 54.

In particular, a rectangular ring shaped engaging ring 72 is movably inserted into the belt 54 extended in the direction of the separable engaging ring 56 through the belt through hole 63. An engaging hole 74 in which the T-shaped fixing member 70 is inserted is formed on an inner diameter surface of the engaging ring 72.

In more detail, the engaging hole 74 of the engaging ring 72 in which the T-shaped fixing member 70 is inserted in a hole for receiving the belt 54. An engaging groove 76 is formed on the upper side of the same for inserting a neck part 71 of the T-shaped fixing member 70.

The engaging method of the fourth engaging member according to the present invention will be described.

The separable hook 55 connected to one end of the belt 54 is engaged to the connection member 30, and the opposite separable engaging ring 56 is engaged to one of the length adjusting members 36 of the connection part 32*a*.

The upper side of the tilting plate 62 is tilted by holding the same at an angle of 180° with respect to the lower end having the belt through hole 63, and the belt 54 maintaining a row is tensely tightened, and the belt 54 is overlapped and folded at the portion in which the belt through hole 63 is formed.

As the belt 54 is overlapped and folded, the tensional force of the belt 54 is tensely tightened, and the T-shaped fixing member 70 is inserted into the engaging hole 74 of the engaging ring 72 for maintaining a tightened tensional force, and at the same time the neck part 71 of the T-shaped fixing member 70 is inserted into the engaging groove 76, so that the fourth engaging member 400 is engaged.

In the present invention, the structure of the engaging member engaging a plurality of the spikes connected through a connection member is changed to the structure having the locking member able to prevent the escape, so that it is possible to maintain a tightened tensional force with respect to the spikes while preventing a loosening.

FIGS. 19 and 20 are views illustrating a disassembled perspective view and an operation state of a fifth engaging member of a vehicle slipping prevention device according to the present invention.

The fifth engaging member 500 includes longitudinal holes 501*b* and 502*b* on both side pieces 501*a* and 502*a* of the upper and lower handles 501 and 502 which are formed at slanted angles. The fixing plates 501*c* and 502*c* having fixing shoulders 501*c*' and 502*c*' are movably fixed with the helps of the elastic forces of the springs 501*d* and 502*d*. The support shoulder 502*e* and the fixing groove 502*f* are formed at the inner outer surfaces of the lower handle 502, and the circular protrusion 501*f* larger than the radius size of the latch 503 is formed on an inner outer surface of the upper handle 501 while separating the engaging hole 503*a*. The operation member 500' is formed by inserting the latch 503 between the upper and lower handles 501 and 502 and the inner ends of the same.

There is provided a belt 54 of which one end is wound on a winding rod 504 through the upper handle 501, and the other end is engaged with the separable hook 55.

In addition, there is provided a belt 54 of which one end is engaged to the lower handle 502, and the other end is engaged with the separable engaging ring 56.

The engaging method of the fifth engaging member according to the present invention will be described.

The assembly of the upper and lower handles 501 and 502 is finished by elastically supporting the fixing plates 501*c* and 502*c* at the intermediate portion of the upper and lower handles 501 and 502 with the helps of the springs 501*d* and 502*d*.

When the upper and lower handles 501 and 502 are assembled through a certain assembling process, a plurality of latches 503 are inserted into both inner sides and are engaged using each winding rod 504. The operation member 500' is finished with the cover 505 being engaged to both ends of the winding rod 504 for protecting the both sides of the winding rod 504.

The outer end of the lower handle 502 is fixed at the other end of the belt 54 of which one end is engaged with the separable engaging ring 56.

The belt 54 of which one end is engaged with the separable hook 55 is engaged for thereby finally finishing the engagement.

When using the fifth engaging member 500, the spikes 10 are placed closely to the double wheels 16, and the separable engaging ring 56 of the belt 54 engaged to the lower handle 502 is connected to one end of both ends of the connection member 30 which connects the spikes 10, and the separable hook 55 of the belt 54 is connected to the other end, and the upper handle 501 of the operation member 500' is installed in an outward direction of the double wheel 16.

One end of the belt 54 engaged with the separable hook 55 is inserted into the space between the winding rods 504 and is rotated a few times by pulling or pushing the same, so that the winding rod 504 rotates in one direction, and the belt 54 is wound on the outer surface of the winding rod 504, and at the same time the connection member 30 is pulled. The spikes 10 are closely contacted with the double wheels 16, so that an operation is force is obtained along with a rotational force of the double wheels 16 and the vibrations occurring when contacting with the surface of the road.

When the upper handle 501 is operated, the fixing plate 501c moves forward with the help of the elastic force of the spring 501d, and at the same time the fixing shoulders 501c' of both sides are engaged with the gear of each latch 503.

In this state, the lower handle 502 is held by one hand, and the upper handle 501 is held by the other hand, and the upper handle 501 is folded toward the lower handle 502, and the fixing shoulder 501c' of the fixing plate 501c moves in a slanted direction of the gear formed in each latch 503. Since the fixing shoulder 502c' of the fixing plate 502c of the lower handle 502 is engaged with the gear, the latch 503 does not rotate, and only the upper handle 501 rotates. So, the upper handle 501 is exploded in the upward direction.

Namely, in a state that the fixing shoulder 501c' is engaged with the gear of the latch 503, the fixing shoulder 501c' moves in a direction reverse to the gear, so that the latch 503 rotates together. So, the winding rod 504 rotates, and the inner end of the belt 54 inserted through the space between the winding rods 504 is wound and pulled as much as the winding rod 504 rotates. So, it is possible to easily generate a tensional force in the connection member 30, thus saving time.

The engaging member and its engaging method according to a sixth embodiment of the present invention will be described.

FIGS. 21 through 23 are a disassembled perspective view, an engaged perspective view and its use state of a sixth engaging member of a vehicle slipping prevention device according to the present invention.

A plurality of engaging protrusions 605a are formed on one end of the sixth engaging member 600, and the engaging member 605 having an engaging hole 605b is formed at the other end.

The engaging protrusion 605a has a slight inclination side at one end, and has a vertical side at the other end.

An engaging piece 606c supported by a torsion spring 606b and engaged with the engaging protrusion 605a is formed at an upper side of the insertion space 606a formed at one end, with the engaging member 605 being inserted into the insertion space, and the engaging body 606 having the engaging hole 606d is formed at the other end.

The engaging body 606 is formed so that the engaging member 605 can be inserted, and the engaging piece is fixed at the upper surface of the engaging body 606 at a slanted state by means of an elastic force of the torsion spring 606b, with the engaging piece being engaged by means of the vertical surface of the engaging protrusion 605a of the engaging member 605.

The engaging piece hole 606f having a hinge 606f is formed at both sides on the upper surface of the engaging body 606, so that the engaging piece 606c is exposed through the insertion space 606a, and the pin hole 606c' is formed in the engaging piece 606c and is inserted into the engaging piece hole 606f, and the both ends of the pin 606e are inserted into the hinge 606f, respectively.

There are provided a belt 54 of which one end is engaged with the engaging hole 605b of the engaging member 605, and the other end is engaged with the separable hook 55 for thereby connecting to the engaging member 605 and the engaging body 606 and a belt 54 of which one end is engaged to the engaging hole 606d of the engaging body 606, and the other end is engaged with the separable engaging ring 56.

The engaging method of the sixth engaging member according to the present invention will be described.

When using the sixth engaging member 600, the spikes 10 are placed closely to the double wheels 16, and the separable hook 55 of the belt 54 connected to the engaging member 605 is connected to one end of both ends of the connection member 30 which connects the spike 10, and the separable engaging ring 56 of the belt 54 connected to the engaging body 606 is connected to the other end of the connection member 30.

In a state that the connection member 30 is pulled with a tightened tensional force, the spikes 10 are closely contacted with the double wheels 16, and the engaging member 605 is inserted into the insertion space 606a of the engaging body 606.

In other words, the slight slanted side of the engaging protrusion 605a of the engaging member 605 moves towards the insertion space 606a of the engaging body 606 and is inserted.

The engaging member 605 is inserted into the insertion space 606a of the engaging body 606, and at the same time the engaging piece 606c being supported by the elastic force of the torsion spring 606b slides along the slight slanted surfaces of the engaging protrusions 605a and is engaged to the vertical side of the engaging protrusion 605a.

When the connection member 30 is loosened, the engaging member 605 is inserted deep into the engaging body 606, and a plurality of the engaging protrusions 605a pass through the engaging piece 606c. When the connection member 30 is pulled and tightened, the engaging piece 606c is engaged to the vertical surface of one engaging protrusion 605a for thereby connecting the connection member 30.

The engaging piece 606c engaged to the vertical side of the engaging protrusion 605a is closely contacted between the engaging protrusions 605a with the help of the elastic force of the torsion spring 606b, so that it is possible to prevent some escapes by means of the rotational force or vibrations of the double wheels 16.

When the use of the sixth engaging member 600 is finished, the upper side of the engaging piece 606c is pressed so as to separate the engaging member 605 from the engaging body 606, the torsion spring 606b is pressed, and at the same time the end of the engaging piece 606c, which keeps supporting the engaging protrusion 605a, is simply disengaged from the engaging protrusion 605a, so that the engaging member 605 can be easily separated from the engaging body 606.

FIGS. 24 through 27 are a disassembled perspective view, a use state engaged perspective view, and an engaging sequence cross sectional view of a seventh engaging member and its installation in a double wheel tire of a vehicle slipping prevention device according to the present invention.

An insertion member 701a is formed at one end of the engaging member 700, and an engaging hook member 701b connected with the connection member 30 is formed at the other end. The engaging member 701 having a plurality of engaging holes 701c is formed between the engaging hook member 701b and the insertion member 701a.

The insertion member 701a and the engaging hook member 701b are formed by integrally bending the engaging hook member 701b in a channel shape with one side open in a downward direction.

The engaging body 702 in which the insertion member 701a of the engaging member 701 is inserted is formed in a U shape when it is viewed from the front side as the engaging member 701 is inserted.

Here, the engaging body 702 comprises a bottom piece 702b having an engaging hook member 702a connected to the connection member 30 at its one end, a fixing pin hole 702d provided at both sides of the bottom piece 702b and engaged with the fixing pin 702c with respect to the engaging hook member 702a, and a body 702g in which the rotation pin holes engaged with the rotation pins 702e are sequentially formed.

The engaging hook member 702a is formed same as the engaging hook member 701b of the engaging member 701.

The fixing pin 702c is engaged to the fixing pin hole 702d across the engaging body 702 and is fixed using a welding method.

The rotation pin 702e is formed lower than the fixing pin hole 702d and is inserted into the rotation pin hole 702f and is freely rotation.

There is provided an engaging piece 702j which is fixed at an upper side of the rotation pin 702e of the engaging body 702 and is connected with a tensional spring 702h connected to the fixing pin 702c and rotates and returns. The engaging piece 702j has an engaging member 702i which is protruded downward.

In other words, the rotation pin 702e is inserted into the rotation pin hole 702f and is freely rotated. As a flat head nail shaped engaging piece 702j is placed on an upper side of the rotation pin 702e and is fixed by a welding method for thereby preventing an escape of the rotation pin 702e.

An engaging hole 702j' engaged with one end of the tensional spring 702h is formed at the side opposite to the portion of the engaging member 702i in the engaging piece 702j, and the engaging terminal 702i faces the bottom piece 702b of the engaging body 702. The engaging piece 702j keeps rotated so that it contacts with the upper surface of the bottom piece 702b.

In the engaging piece 702j, one end of the tensional spring 702h is connected to the engaging hole 702j' for preventing an up and down movement in a state fixed to the rotation pin 702e, and the other end is connected with the fixing pin 702c. So, even when the engaging piece 702j is rotated, it can return by means of an elastic force of the tensional spring 702h.

A connection ring 703 is formed at each end of the connection member 30 which connects the spikes 10, with the engaging hook member 701b of the engaging member 701 and the engaging hook member 702a of the engaging body 702 being connected to the connection ring 703, respectively.

The engaging method of the seventh engaging member according to the present invention will be described.

When using the seventh engaging member 700, the spikes 10 are closely contacted with the double wheels 16. The engaging hook member 701b of the engaging member 701 is inserted into one connection ring 703 engaged at both ends of the connection member 30 which connects the spikes 10, and the engaging hook member 702a of the engaging body 702 is inserted and connected with the connection ring 703.

The insertion member 701a of the engaging member 701 is inserted between the wall plates 702g' of the engaging body 702 in a direction opposite to the engaging hook terminal 701b.

At this time, the engaging member 701 is inserted while lifting up the engaging member 702i of the engaging piece 702j, and the engaging piece 702j closely contacts with the upper surface of the engaging member 701 while being supported by the elastic force of the tensional spring 702h.

When the insertion of the engaging member 701 is finished, the engaging member 702i of the engaging piece 702j is inserted into the engaging hole 701c of the nearest engaging member 701, so that the engaging member 701 is not escaped from the engaging body 702.

In order to provide the connection member 30 with a pulling tensional force, the engaging member 700 and the engaging body 702 are engaged with each other, and an end of a certain tool is inserted into the engaging hole 701c by using a certain tool which can be inserted into the engaging hole 701c like a driver, and the engaging member 700 moves forward and is engaged by using the fixing pin 702c as a lever.

As shown in FIGS. 28 and 29, in order to prevent a loosening of the engaging member 700, the connection ring 801 is engaged to the connection member 30 toward each backward side of the spike 10 positioned at both sides of the engaging member 700. There is provided an auxiliary engaging member 800 having a contractive band 803 with a separable hook 802 at both sides of the same for a connection to the connection ring 801.

The auxiliary engaging member 800 is provided for operating like the chains while not escaping from the double wheels 16 even when the engaging member 700 is broken by means of an over centrifugal force, over vibrations and over running force when the double wheels 16 runs after the engaging member 700 is installed in the double wheels 16.

As shown in FIG. 30, the reinforcing protrusion 52a is designed so as to prevent the damages of the road by minimizing the spiking damages of the road by the spikes 10 by forming a plurality of cut holes 102 corresponding to the cut pieces 101 at the close contact member 14 of the spike 10. The reinforcing protrusion 52a is formed in a semicircular cylindrical shape inserted between the cut pieces 101.

A cut shoulder 52a' having a cut portion is formed at both sides of the reinforcing protrusion 52a for a stable engagement with the cut piece 101. So, when the reinforcing protrusion 52a contacts with the surface of the road, a stable support is obtained.

As shown in FIGS. 1, 31 through 34, the connection member 30 is formed of one among the chain 31, a metallic wire, a rope bar, a rubber and a belt 32.

In order to engage the chain 31 to the spike 10, a slanted groove (not shown) is formed at the front/rear ends of the center upper portion of the spike 10, and the chain 31 is inserted into the groove, and the opening of the groove is hit, so that the chain 31 is not disengaged from the groove.

A friction rubber pad 11a formed of a FRP or urethane material surrounds the upper surface 11 of the spike 10 for an engagement with the spike 10 by using one among a metallic wire, a rope bar and a rubber bar, and a metallic wire, rope bar and rubber bar pass through the U-shaped clamp 11b by using a nut 11c, with threads being formed at both ends.

A pair of bolt holes (not shown) are formed on the upper surface 11 of the spike 10 while passing through the both ends of the U-shaped clamp 11b.

The metallic wire, rope bar and rubber bar are placed at a lower side of the upper surface 11 of the spike 10, and the metallic wire, rope bar and rubber bar are mounted in the U-shaped clamp 11b, and both ends of the U-shaped clamp 11b are inserted into the bolt hole formed in the spike 10, so that the both ends are exposed over the upper surface 11 while stably engaging the nut 11c.

At this time, a friction rubber pad 11a formed of a FRP or urethane material is formed on the upper surface 11 of the spike 10 for the following reasons. Namely, when it is engaged with the spike 10 by using a metallic wire, rope bar, rubber bar and belt 32, the spike 10 and the metallic wire, rope bar, rubber bar, and belt 32 may collide with each other and may be broken owing a slight movement in a fixed state with the spike 10, so that a durability may be worsened or a cutting problem may occur. So, it is provided for prevent a concentration of stress.

The connection member 30 is formed of a belt 32. It is preferably fixed by the method of a rivet 11d for an engagement with the spike 10 having the friction rubber pad 11a.

When engaging the connection member 30 by using the U-shaped clamp 11b, it is preferably engaged with the spike 10 by using the rivet 11d for preventing a folding problem of the belt 32 since the belt 32 has a relatively wider width.

Each end of the metallic wire, rope bar and rubber bar disposed between the spikes 10 is formed in a ring shape and passes through each other and is fixed with a tightening clamp 11e for a tie connection.

A metallic wire, rope bar and rubber bar disposed between the neighboring spikes 10 are cut, and each end of the same is connected with each other for forming a ring shape, and each end of the same is pressed by the tightening clamp 11e.

In other words, when it is needed to perform a change or maintenance of the part owing to an abrasion or damage of the spike 10, it is possible to separate and exchange a needed part by disengaging the tightening clamp 11e. So, a small amount of part change is needed, and an easier maintenance is obtained.

As shown in FIGS. 35 through 38, a C-shaped clamp 11f may be used. Both ends having the threads 11f' are opened and closed by means of the opening and closing member 11g so that the chain 31 and belt 32 disposed between the spikes 10 are bent and separated.

The chain 31 and belt 32 disposed between the neighboring spikes 10 are cut. Both ends having the threads 11f' of the C-shaped clamp 11f are opened by using the opening and closing member 11g and are engaged to each end, and the C-shaped clamps 11f connected to the chain 31 and the belt 32 are connected with each other, and the opening and closing member 11g is engaged to the both ends having the threads 11f' for thereby closing the C-shaped clamp 11f.

When the connection member 30 is too short or long to engage owing to the difference in the diameters of the double wheels 16, the chain 31 and the belt 32 connected to the spike 10 of one section are added or separated, so that the cost needed for part changes is decreased, and the repair is easy.

The separable hook 55 and the separable engaging ring 56 are formed of a C-shaped clamp 11f of which both ends having the threads 11f' are opened and closed by means of the opening and closing member 11g.

In a state that the engaging members 100, 200, 300, 400, 500, 600 and 700 are not used, a direction connection is made to the connection member 30 connected to the opposite spike 10 by using the C-shaped clamp 11f, so that applicability is enhanced.

As shown in FIGS. 39 and 42, there are provided a tensional force member 81 having a through hole 81a at both ends for passing through the connection member so as to allow the connection member 30 to generate a tensional force for closely contacting the spike 10 to the wheels, and a tensional force adjusting member 80 which passes through the center of the tensional force member 81 in an up and down direction and is provided with a bolt hole (not shown) for engaging the tensional force bolt 82 so that the connection member 30 can be pressed.

According to another embodiment of the present invention, there are provided a tensional force member 91 having a through hole 91a at both ends for passing through the connection member 30 for allowing the connection member 30 to generate a tensional force by closely contacting the spike 10 to the wheels and having a movable longitudinal hole 91b formed at its center upper portion, and a tensional force adjusting member 90 having a tensional force bar 92 provided with a handle 92a and a support piece 92b for pressing the connection member 30 with the help of a tilting operation as it is inserted into the movable longitudinal hole 91b of the tensional force member 91. The tensional force adjusting members 80 and 90 is wound on the double wheels 16 and is used when it is needed to make the connection member positioned on the opposite site connected with the connection members 100, 200, 300, 400, 500, 600 and 700 or disposed on the left and right sides become loosened or it is needed to closely contact the spikes 10 to the double wheels 16.

Namely, the tensional force adjusting member 80 connects the connection member 30 wound on the double wheels 16 by using the connection members 100, 200, 300, 400, 500, 600 and 700. When the tensional force bolt 82 is rotated by using a certain tool, the connection member 30 is transformed in a V shape at the lower end of the tensional force bolt 82, and a certain tensional force is provided to the loosened connection member 30, and the spikes 10 are closely contacted with the double wheel 16. So, it is possible to prevent a position change or vibrations which may occur owing the rotation of the double wheels 16.

The tensional force adjusting member 90 more easily operate as compared to the tensional force adjusting member 80. The connection member 30 wound on the double wheels 16 is connected using the connection members 100, 200, 300, 400, 500, 600 and 700. The handle 92a of the tensional force bar 92 is held and tilted in the opposite direction, so the handle 92a moves along the movable longitudinal hole 91b, and at the same time the end of the support piece 92b contacts with the connection member 30, and the connection member 30 is pressed and transformed in a V shape for thereby providing the loosened connection member 30 with a tensional force. The spikes 10 are closely contacted with the double wheels 16, and the tensional force bar 92 is not escaped from the connection member 30 with the helps of the support force of the connection member 30 and the support piece 92b. So, a position change and vibrations are removed as the double wheels 16 rotate, and noises are reduced.

As shown in FIGS. 43 and 44, an auxiliary chain 13 is connected to each end of the spike 10. A V-shaped subsidence prevention piece 15 is provided with an insertion groove 15a at both sides for a connection to the auxiliary chain 13.

At this time, the auxiliary chain 13 is connected in the same method as the chain 31 and the spike 10 are connected with each other. When a vehicle runs in a region having a lot of moisture or snow or runs on a soft ground such as a desert, the auxiliary chain 13 is able to minimize the slipping or the subsidence of the double wheels 16.

The subsidence prevention piece 15 is engaged so that it is not escaped from the auxiliary chain 13 by hitting the opening of the insertion groove 15a after the auxiliary chain 13 is inserted into the insertion groove 15a. The ground having a lot of substance is substantially supported differently from the function of the auxiliary chain 13, so that it is possible to prevent an idle rotation of the double wheels 16, and it is possible to enhance a driving force.

INDUSTRIAL APPLICABILITY

As described above, the vehicle slipping prevention device according to the present invention has the following advantages.

1) It is possible to prevent an abrasion of spikes by riveting a rod made of tungsten or titanium in the spikes.

2) The structure of an engaging member able to engage a plurality of spikes connected with a connection member is changed to the structure having a locking member which is able to prevent disengagement. So, it is possible to prevent the loosening of an engaging member irrespective of the vibrations occurring as the vehicle runs.

3) The structure of an engaging member able to engage a plurality of spikes connected with a connection member is changed to a structure having a stripe shaped belt and tilting member, so that an easier engaging and disengaging work is implemented. Even a lot of vibrations occurring as the vehicle runs do not affect loosening. It is possible to maintain a tightened tensional force with respect to a plurality of spikes.

4) The spikes are closely contacted with the double wheels so that the connection member can be bent and separated, so that a position change and vibrations owing to the rotation of double wheels do not occur. The noises are reduced. Only the part, which needs a change or maintenance, can be removed, so that the cost needed for part change and maintenance can be significantly saved.

5) The auxiliary chain and subsidence prevention piece are provided in the spikes, so that when a vehicle runs on a road having a lot of subsidence, a slipping and subsidence are prevented, and a driving force is enhanced.

6) Since one or more tensional force adjusting members are provided, a uniform tensional force can be supplied to the connection member wound on the double wheels, so that it is possible to prevent part of the connection member from being loosened or to prevent an over tensional force from being concentrated.

7) The connection member is made of a chain, metallic wire, rope bar, rubber bar, belt or something, so its applicability is enhanced. Various kinds of light products can be manufactured depending on the given environments.

The engaging member can be fast engaged under a bad condition such as an icy road, snow road, desert, fens or rail road while preventing an easier disengagement of the same. A stable running performance and a braking reliability of the spikes are obtained in the present invention for thereby minimizing the possibility of slipping accident.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

The invention claimed is:

1. A vehicle slipping prevention device, comprising:
a plurality of spikes 10 formed of an insertion member 12 of which an intermediate portion is V-shaped for being inserted into a space formed between double wheels 16 and a close contact member 14 which is flat-contacted with both sides of the insertion member 12 for a close contact with the surface of each tire of the double wheels 16; a connection means 30 which connects the insertion member 12 of the spikes 10; and,
an engaging member which engages both ends of the connection means 30;
wherein said engaging member 700 includes:
an engaging member 701 which has an engaging hook member 701b of which one end is formed of an insertion member 701a, and the other end is connected to the connection means 30, with a plurality of engaging holes 701c being formed between the engaging hook member 701b and the insertion member 701a in a row;
an engaging body 702 which has a bottom piece 702b formed of an engaging hook member 702a connected with the connection means 30 at one end in a U shape so that the insertion member 701a of the engaging member 701 is inserted, a fixing pin hole 702d for engaging a fixing pin 702c with respect to the engaging hook member 702a at both sides of the bottom piece 702b, a body 702g in which rotation pin holes 702f engaged with a rotation pin 702e are sequentially formed on a wall plate 702g', and an engaging piece 702j which is fixed at an upper side of the rotation pin 702e and is connected with a tensional spring 702h connected with the fixing pin 702c and performs a rotation and return operation, and is formed of an engaging member 702i which is downwardly protruded for an engagement by the engaging hole 701c; and a connection ring 703 which is provided at each end of the connection means 30 for connecting the engaging hook member 701b of the engaging member 701 and the engaging hook member 702a of the engaging body 702.

2. The device of claim 1, further comprising an auxiliary engaging member 800 in which a connecting ring 801 is engaged to the connection means 30 in a backward direction of the spike 10 positioned at both sides of the engaging member 700 for preventing a loosening phenomenon of the engaging member 700, with the auxiliary engaging member 800 being formed of a contractive band 803 having a separable hook 802 at both ends for a connection to the connection ring 801.

3. The device of claim 1, wherein said connection means 30 is formed of a belt 32 and is fixed by a method of using a rivet 11d for an engagement with the spike 10 having a friction rubber pad 11a.

* * * * *